(12) United States Patent
Schneider

(10) Patent No.: US 8,682,053 B2
(45) Date of Patent: Mar. 25, 2014

(54) METHOD FOR SAMPLING VOLUME DATA OF AN OBJECT IN AN IMAGING DEVICE

(75) Inventor: Robert Schneider, Rosstal (DE)

(73) Assignee: Siemens Aktiengesellschaft, Munich (DE)

( * ) Notice: Subject to any disclaimer, the term of this patent is extended or adjusted under 35 U.S.C. 154(b) by 1053 days.

(21) Appl. No.: 12/684,156

(22) Filed: Jan. 8, 2010

(65) Prior Publication Data

US 2011/0170756 A1    Jul. 14, 2011

(51) Int. Cl.
*G06K 9/00*    (2006.01)
*G06K 9/36*    (2006.01)
*G06T 15/06*    (2011.01)
*G06T 15/08*    (2011.01)

(52) U.S. Cl.
USPC ............ 382/131; 345/419; 345/423; 345/424

(58) Field of Classification Search
USPC .......................... 382/131; 345/419, 423, 424
See application file for complete search history.

(56) References Cited

U.S. PATENT DOCUMENTS

| | | | | |
|---|---|---|---|---|
| 5,313,567 | A * | 5/1994 | Civanlar et al. | 345/424 |
| 5,760,781 | A * | 6/1998 | Kaufman et al. | 345/424 |
| 5,847,711 | A * | 12/1998 | Kaufman et al. | 345/424 |
| 6,876,361 | B2 * | 4/2005 | Venkataraman | 345/424 |
| 7,133,041 | B2 * | 11/2006 | Kaufman et al. | 345/419 |
| 7,301,538 | B2 * | 11/2007 | Buyanovskiy | 345/426 |
| 7,333,107 | B2 * | 2/2008 | Papageorgiou | 345/424 |
| 7,424,140 | B2 * | 9/2008 | Matsumoto | 382/128 |
| 7,471,291 | B2 * | 12/2008 | Kaufman et al. | 345/424 |
| 7,778,451 | B2 * | 8/2010 | Matsumoto | 382/128 |
| 7,826,684 | B2 * | 11/2010 | Yu et al. | 382/294 |
| 7,903,113 | B2 * | 3/2011 | Krishnan et al. | 345/424 |
| 8,244,018 | B2 * | 8/2012 | McKenzie et al. | 382/131 |
| 8,294,706 | B2 * | 10/2012 | Xue et al. | 345/419 |
| 2007/0065001 | A1 | 3/2007 | Yu et al. | |

OTHER PUBLICATIONS

P. La-croute and M. Levoy. "Fast volume rendering using a shear-warp factorization of the viewing transformation" in Proceedings of ACM SIGGRAPH, pp. 451-458, 1994; Others; 1994.

Daniel Weiskopf, Manfred Weiler, Thomas Ertl. "Maintaining Constant Frame Rates in 3D Texture-Based Volume Rendering". CGI '04: Proceedings of the Computer Graphics International, pp. 604-607, 2004;; Others; 2004.

K. Ma et al., "A Data Distributed, Parallel Al-gorithm for Ray-Traced Volume Rendering. Proc. Parallel Rendering Symp"., ACM, 1993, pp. 15-22.); Others; 1993.

(Continued)

*Primary Examiner* — Allen C. Ho
(74) *Attorney, Agent, or Firm* — Harness, Dickey & Pierce, P.L.C.

(57) ABSTRACT

A method for sampling volume data of an object in an imaging device is disclosed. The method includes creating a voxel dataset of a first volume associated with the object using a scanning device and saving the voxel dataset; defining a grid of sampling positions by casting rays through the first volume and choosing a number of points along a respective ray; choosing a sampling access pattern that defines a sequence of the sampling positions; selecting an interpolation scheme mapping the sampling access pattern to a voxel access pattern defining a sequence of the voxels of the voxel dataset; successively loading memory lines of a main memory comprising the data associated with the respective voxel into a cache memory if the memory line is not already present in the cache memory; and processing the data associated with the respective voxel, the cache memory access being optimized for rendering time performance.

20 Claims, 19 Drawing Sheets

(56) References Cited

OTHER PUBLICATIONS

Steven Parker, Peter Shirley, Yarden Livnat, Charles Hanse, Peter-Pike Sloan. "Interactive ray tracing for isosurface rendering". VIS '98: Proceedings of the conference on Visualization '98, pp. 233-238.; Others; 1998.

Palmer M E, Brian Totty, Stephen Taylor: "Ray Casting on Shared-Memory Architectures. Memory-Hierarchy Considerations in Volume Rendering", IEEE Concurrency, IEEE Service Center, Piscataway, NY, US, vol. 6, No. 1, Jan. 1998, pp. 20-35, XP000737883.; Others; 1998.

Aaron Knoll, Charles Hansen and Ingo Wald.: "Coherent Multiresolution Isosurface Ray Tracing". Scientific Computing and Imaging Institute, University of Utah. Technical Report No. UUSCI-2007-001; Others.

Michael Abrash. "Rasterization on Larrabee." http://software.intel.com/en-us/articles/rasterization-on-larrabee/Others; 2009.

Singh, Jaswinder Pal and Gupta, Anoop and Levoy, Marc. :"Parallel Visualization Algorithms: Performance and Architectural Implications" Computer, pp. 45-55, Jul. 1994, IEEE; Others; 1994.

Seiler, Larry et al., Larrabee: a many-core x86 architecture for visual computing, ACM Trans. Graph., vol. 27, No. 3, Article 18, pp. 1-15, 2008.; Others; 2008.

Sören Grimm, Stefan Bruckner, Armin Kanitsar and Eduard Gröller. "A refined data addressing and processing scheme to accelerate volume raycasting". Computers & Graphics, vol. 28, Issue 5, Oct. 2004, pp. 719-729.; Others; 2004.

G. Knittel. "The Ultravis system". In Proceedings of IEEE Symposium on Volume Visualization, pp. 71-79, 2000.: Others; 2000.

Gerd Marmitt, Heiko Friedrich, and Philipp Slusallek, "Interactive Volume Rendering with Ray Tracing", State-of-the-Art Report (STAR) at Eurographics 2006, Vienna, Austria, Nov. 4-8, 2006; Others; 2006.

A. Law and R. Yagel. "Multi-frame thrashless ray casting with advancing ray-front". In Proceedings of Graphics Interfaces, pp. 70-77, 1996,; Others; 1996.

Stefan Bruckner. "Efficient Volume Visualization of Large Medical Datasets". Mastersthesis, Institute of Computer Graphics and Algorithms, Vienna University of Technology, 2004.; Others; 2004.

\* cited by examiner

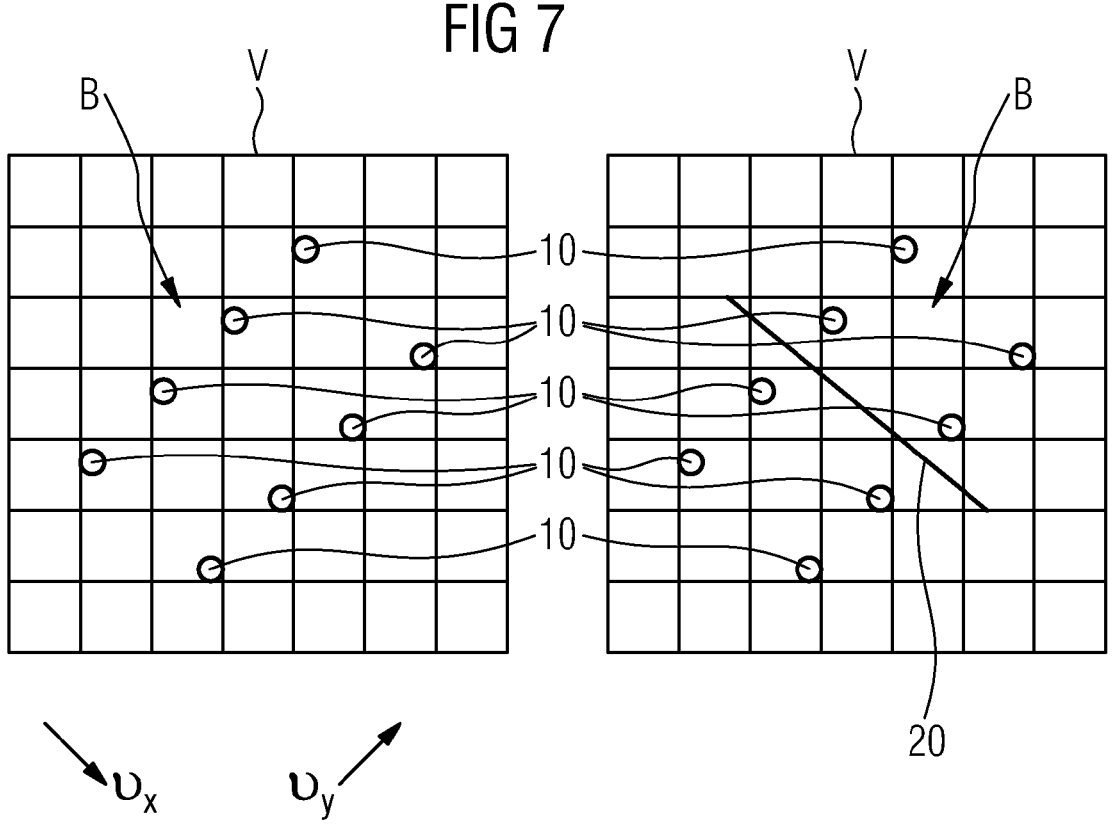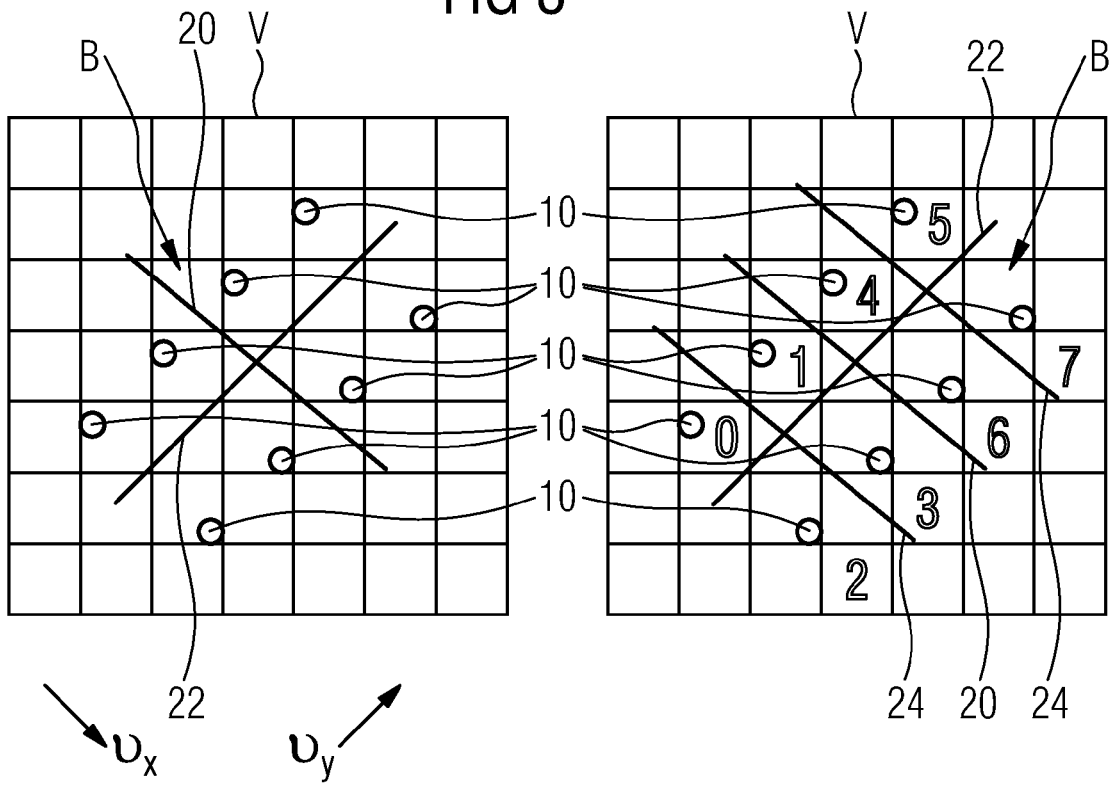

Min: 154,42 ms  Av: 226,16 ms  Max: 275,44 ms

Min: 74,27 ms  Av: 76,39 ms  Max: 78,11 ms

Min: 44,77 ms  Av: 50,56 ms  Max: 54,88 ms

Min: 45,44 ms  Av: 51,19 ms  Max: 55,57 ms

Min: 71,30 ms  Av: 72,77 ms  Max: 73,71 ms

Min: 38,82 ms Av: 39,53 ms Max: 41,40 ms

Min: 75,50 ms Av: 76,68 ms Max: 77,70 ms

Min: 39,14 ms Av: 40,43 ms Max: 41,85 ms

Min: 46,27 ms  Av: 48,86 ms  Max: 52,90 ms

Min: 70,96 ms  Av: 72,09 ms  Max: 73,12 ms

Min　　　　　Average　　　　　Max

Min　　　　　Average　　　　　Max

METHOD FOR SAMPLING VOLUME DATA OF AN OBJECT IN AN IMAGING DEVICE

FIELD

The present application generally relates to a method for sampling volume data of an object in an imaging device.

BACKGROUND

Sampling of volume data on a regular grid is an essential and time consuming part of many algorithms that are used e.g. in medical imaging appliances such as NMR- or CT-scanners. Examples that fall into this class are all kind of volume rendering algorithms (e.g. VRT, MIP, MINIP, DDR, SSD, MPR) based on an orthographic projection using a ray-casting approach. Volume rendering is just one example where volume data has to be sampled massively on a regular grid, other examples are e.g. automatic registration or volume resampling.

In the case of volume rendering using an orthographic camera, such a regular grid arises when using a ray-casting approach. The basic form of ray-casting comprises the following steps: For each pixel of the final two-dimensional image, a ray of sight is shot (i.e. "cast") through the volume. Along the part of the ray of sight that lies within the volume, usually equidistant sampling positions or samples are selected. As in general the voxel dataset describing the volume is not aligned with the ray of sight, sampling positions usually will be located in between voxels. Because of that, it is necessary to interpolate the values of the samples from its surrounding voxels. The sampling results along the ray are then used to calculate the pixel data in the planar result image.

Another very important case where such regular sampling grids appear is automatic volume registration using e.g. mutual information; here the sampling results are used to construct the mutual histogram. In this case the regular grid arises since the samples are defined by the regular voxel grid of one of the two volumes that have to be registered.

A third important case is volume resampling, where one applies an affine transformation on a given volume and needs to resample this transformed volume to form a new volume.

In the following we will mainly focus on volume rendering as example application, but we clearly want to emphasize that the presented algorithm works generally for all cases where one has to do sampling calculations on a regular grid.

The simplest kind of interpolation used when determining the value of the samples is based on Nearest Neighbour interpolation and just retrieves the value of the voxel that is most close to the sampling position. However, due to image quality reasons, sampling is usually at least done using trilinear interpolation, which means that at least 8 voxels of the volume dataset have to be touched to produce the result of a single sample. Better image quality can be achieved using higher order interpolation schemes like cubic interpolation, such higher order interpolation schemes soon require an even larger amount of voxels of the volume dataset to be taken into account per sample. Nearest Neighbour, trilinear and tricubic interpolation are just some examples of volume sampling, generally a sampling in the following can be interpreted as any operation where calculations are done using the voxel data in a local neighbourhood of a sampling position as input. For example in the case of rendering a shaded VRT such a generalized sampling operation would be the local gradient computation that has to be done at each sampling position.

Because of the size of modern voxel datasets in medical imaging, to calculate all samples on such a regular grid of sampling positions that are inside the volume dataset, an enormous amount of memory accesses have to take place. Since the computation power improvement of the hardware due to parallelization advances by increasing the number of computation cores is larger than the memory bandwidth and memory latency advancement, for algorithms that heavily do volume sampling, the volume data memory access performance in many cases becomes the limiting factor that determines the overall performance.

On most hardware, accessed memory lines are cached, so that once a memory line was loaded it remains in a memory cache for some time. The access to a cache memory is much faster than to standard memory. The memory access strategy is optimal if every memory line in RAM that contains voxel data is loaded only once into the cache for each rendered image or never. If a memory line has to be loaded multiple times into the cache when sampling all regular grid positions, this effect is called cache thrashing.

The size of the thrashing effect usually largely depends on the viewing orientation, assuming the dataset is stored in a linear storage format (slice array) as it is usually the case in medical software frameworks. This effect can be visualized by analyzing the rendering performance depending on the viewing orientation.

It is well known that the performance difference between the fastest and the slowest viewing orientation can become dramatically huge (e.g. on a computer system based on Intel Harpertown CPUs a difference between the fastest viewing orientation and the slowest viewing orientation up to a factor of 40 in some scenarios is noticeable), where the exact number depends on the used hardware (see FIGS. 30 and 35). Because of these enormous performance differences it is the top priority of any volume rendering algorithm to minimize cache thrashing effects.

It is not necessary that there is just one memory cache level available; often there exists a hierarchy of such cache levels. The lowest level cache usually is the smallest one but the fastest, the following levels increase in size but decrease on cache access performance. This complicates the cache thrashing problem, since we not just have to minimize accesses to memory that is not part of a cache, but moreover have to take the cache hierarchy into account to achieve optimal performance.

To improve the memory access performance of volume sampling there are multiple general approaches possible:
A) modify the volume sampling algorithm itself so that memory accesses are more cache friendly.

There are many volume rendering algorithms that fall into this category: One of the most popular algorithms of this category is the original Shear-Warp algorithm. In this technique, the viewing transformation is transformed such that the nearest face of the volume becomes axis aligned with an off-screen image buffer with a fixed scale of voxels to pixels. The volume is then rendered into this buffer using the far more favorable memory alignment and fixed scaling and blending factors. Once all slices of the volume have been rendered, the buffer is then warped into the desired orientation and scaled in the displayed image.

This technique is fast since it is designed to access the memory very efficiently if the dataset is stored in a linear storage format. It can be seen as a mixture of image based and object based volume rendering. The drawback of this approach is that the image quality is not as good as the one from ray-casting based algorithms and that the produced result image quality depends on the orientation angle. Many algorithms were derived from the original Shear-Warp algorithm to decrease the quality impact, so that one could speak nowadays of a family of Shear-Warp algorithms. (see e.g. P. Lacroute and M. Levoy. Fast volume rendering using a shear-warp factorization of the viewing transformation. In Proceedings of ACM SIGGRAPH, pages 451-458, 1994, the entire contents of which are hereby incorporated herein by reference.)

Other algorithms that fall into this category are those based on splatting techniques, which can be categorized as object based volume rendering techniques. Here, each voxel is projected onto the result image and its color is distributed across nearby pixels of the 2D image. As for the Shear-Warp family, also here the memory can be accessed very efficiently if it is stored in a linear format, but on the other side it does not produce the same image quality as ray-casting based approaches.

In general, these approaches usually mean that one trades image quality against performance, which is in most cases not acceptable in medical applications where high quality result images are required.

B) modify the way how the volume dataset is stored in RAM.

A popular approach to reorganize the data is known as bricking. Instead of storing the whole dataset linear in memory, the dataset is decomposed into small 3D blocks of fixed size. If the block is small enough to fit into the largest level of the cache hierarchy, sampling of this block can be done more efficiently. The idea behind this approach is then to decompose the problem to render the whole dataset into the problem to render many small blocks and to compose the intermediate results to the final image. The disadvantage of this approach is that an additional effort is created to decompose the volume rendering task and to compose the results. Also an additional effort has to be taken into account at the boundary of the blocks, so that all voxels that are required for sampling are also available at the block boundary. (see e.g. Daniel Weiskopf, Manfred Weiler, Thomas Ertl. Maintaining Constant Frame Rates in 3D Texture-Based Volume Rendering. CGI '04: Proceedings of the Computer Graphics International, pages 604-607, 2004, the entire contents of which are hereby incorporated herein by reference; K. Ma et al., A Data Distributed, Parallel Algorithm for Ray-Traced Volume Rendering. Proc. Parallel Rendering Symp., ACM, 1993, pp. 15-22, the entire contents of which are hereby incorporated herein by reference.)

Another popular approach to optimize the memory accesses by reorganizing the data is known as swizzling. Here, compared to storing the volume linear in memory, the indices of the swizzled dataset are permutated, so that voxels with close indices are closer together in 3D space than it would be the case with a linear memory arrangement. When accessing memory, each voxel index of a linear layout is transformed into its swizzled index before it is processed any further. Usually, to minimize the cost of this additional re-indexing step the permutation function is chosen so that the index computation can be optimized using lookup tables. (see e.g. Steven Parker, Peter Shirley, Yarden Livnat, Charles Hanse, Peter-Pike Sloan. Interactive ray tracing for isosurface rendering. VIS '98: Proceedings of the conference on Visualization '98, Pages: 233-238, the entire contents of which are hereby incorporated herein by reference.)

In general, instead of storing a volume dataset in a linear layout (slice-array), these approaches modify the volume data storage format so that memory accesses along rays become more coherent and less orientation dependent, leading to a faster average performance. However, a modified, non-standardized data storage format might lead to problems in data exchange and data usage in later processing. Moreover additional computational costs can arise since the indices of all voxels that are used during the sampling step have to be transformed to the storage format.

C) modify the order how the sample positions along the rays are evaluated.

By grouping rays into packets instead of handling single rays sequentially, memory coherency is improved considerably. In practice, these approaches are usually combined with B) since grouping of rays into packets alone reduces cache misses but does not yield excellent performance for all viewing orientations (see FIGS. 30 and 35-40).

The bricking approach mentioned above can also be modified so that the volume is still stored linear in memory, but the volume is nevertheless virtually subdivided into blocks. A block here defines a group of voxels where all samples that lie within are handled completely before switching to the next block. The blocks are sorted in front to back order as defined by the viewing orientation. The image is then calculated by applying an advancing ray-front algorithm onto the blocks, where voxels within the block only have to be loaded once from memory into the cache, assuming that the largest level of the cache hierarchy is large enough to hold the block. This approach minimizes cache thrashing for the largest cache hierarchy level, but not necessarily for all cache hierarchies. Additionally it has the disadvantage that a good amount of overhead is created since rays have to be clipped for each traversed brick and additional data structures have to be maintained during the ray-front traversal to store the information required when advancing the ray-front. Also it would be possible to realize this approach without having to modify the volume storage format, because of performance reasons, this approach is typically combined with the abovementioned bricking approach. (see e.g. A. Law and R. Yagel. Multi-frame thrashless ray casting with advancing ray-front, In Proceedings of Graphics Interfaces, pages 70-77, 1996, the entire contents of which are hereby incorporated herein by reference; and/or Palmer M E, Brian Totty, Stephen Taylor: "Ray Casting on Shared-Memory Architectures. Memory-Hierarchy Considerations in Volume Rendering", IEEE Concurrency, IEEE Service Center, Piscataway, N.Y., US, vol. 6, No. 1, January 1998, pp. 20-35, XP000737883, the entire contents of which are hereby incorporated herein by reference.)

Another approach that is very popular is tile decomposition using ray packets. Here, the result image is decomposed into small tiles and the overall problem to calculate the whole result image is decomposed into the problem to calculate all small tiles. Each tile sub-image is calculated by sampling the required rays slice by slice before the sampling distance is increased to move on along the rays to the next slice. Because of the ray coherence of this strategy, many samples will access the same voxel data. It is more likely that a voxel will be found in the cache already because one of the neighbor rays could have triggered moving the voxel into the cache. Or the voxel could be still in the cache when the ray moves along since the number of rays in the tile is small, which decreases the likelihood that many memory lines have to be touched when sampling all rays at a given distance from their start position.

The big advantage of this algorithm is that it allows a very simple implementation on most hardware, e.g. on CPUs using SIMD or on programmable graphics cards using CUDA or OpenGL. The drawback of this approach compared to the abovementioned block approach is that cache thrashing still occurs noticeably when using a linear slice array volume data format, where the size of the cache thrashing effect is depending on the orientation of the viewing direction. This effect can be detected by comparing the rendering performance for various orientations. The fastest orientation will usually be the one where the viewing orientation is parallel to a voxel line that lies linear in memory. Another issue that can be detected is that when modifying the tile rectangle in its size, such a modification will increase the performance for various viewing orientations and decrease it for others (see FIGS. 30 and 35-40). To minimize the orientation dependency and further improve the performance, this approach is often combined with bricking or swizzling. (see e.g. Aaron Knoll, Charles Hansen and Ingo Wald. Coherent Multiresolution Isosurface Ray Tracing. Scientific Computing and Imaging Institute, University of Utah. Technical Report No UUSCI-2007-001, the entire contents of which are hereby incorporated herein by reference.)

Instead of packeting rays that pass the pixels of the result image as described above, which means to packet just along one direction of the grid of sampling positions, another approach is to also support traversal along the other directions of the grid. Here, one analyzes all angles of the grid directions and basically chooses from them that direction where the angle between the chosen direction and the x-direction of the volume becomes minimal, since the x-direction of a volume would be the direction that guaranties an especially good cache reuse rate for linear slice arrays. In comparison to tile decomposition this approach increases the number of viewing directions that have a good cache reuse rate and thus improves also the average rendering time. However, for grids where no grid direction is close to the x-direction of the volume, this approach can not prevent larger cache thrashing effects. This means that in order to minimize the orientation dependency and further improve the performance, also this approach would also have to be combined with bricking or swizzling. (see e.g. US 2007/0065001 A1, the entire contents of which are hereby incorporated herein by reference.)

A currently very popular approach for doing volume rendering is to exploit the rendering hardware of GPUs by using a graphics API like OpenGL or Direct3D. The volume is here stored as an array of 2D textures or as bricks of 3D textures. Also those GPU approaches can be interpreted as algorithms that are a combination of B) and C), since also here those approaches basically just differ in how the volume is stored and how the sampling positions along the rays are evaluated. The major difference here is that some parts are not directly visible to the developer but are hidden by the GPU hardware and the used graphics APIs.

In the abovementioned cases, the volume rendering problem is decomposed into partitions that naturally allow an implementation on a multiprocessor system. Here, the first approach falls into the category known as object decomposition, while the latter approaches fall into the category known as image decomposition. Further details on these known approaches, the entire contents of each of which is hereby incorporated herein by reference, can be found e.g. in:

Michael Abrash. Rasterization on Larrabee. http://software-.intel.com/en-us/articles/rasterization-on-larrabee/.

Stefan Bruckner. Efficient Volume Visualization of Large Medical Datasets. Mastersthesis, Institute of Computer Graphics and Algorithms, Vienna University of Technology, 2004.

G. Knittel. The Ultravis system. In Proceedings of IEEE Symposium on Volume Visualization, pages 71-79, 2000.

Gerd Marmitt, Heiko Friedrich, and Philipp Slusallek, Interactive Volume Rendering with Ray Tracing, State-of-the-Art Report (STAR) at Eurographics 2006, Vienna, Austria, Nov. 4-8, 2006

Seiler, Larry et al., Larrabee: a many-core x86 architecture for visual computing, ACM Trans. Graph., Volume 27, Pages 1-15, 2008.

Singh, Jaswinder Pal and Gupta, Anoop and Levoy, Marc. Parallel Visualization Algorithms: Performance and Architectural Implications. Computer, pages 45-55, 1994.

Sören Grimm, Stefan Bruckner, Armin Kanitsar and Eduard Gröller. A refined data addressing and processing scheme to accelerate volume raycasting. Computers & Graphics, Volume 28, Issue 5, October 2004, Pages 719-729.

SUMMARY

At least one embodiment of the present invention provides methods and systems for sampling volume data of an object in an imaging device. At least one embodiment of the method comprises the steps of creating a voxel dataset of a first volume associated with the object by means of a scanning device and saving said voxel dataset in a main memory; defining a grid of sampling positions by casting a ray through said first volume for a plurality of pixels of said two-dimensional image and choosing a number of points along the respective ray; choosing a sampling access pattern from a plurality of sampling access patterns defining a sequence of said sampling positions; selecting an interpolation scheme mapping said sampling access pattern to a voxel access pattern defining a sequence of the voxels of said voxel dataset; according to said voxel access pattern, successively loading memory lines of said main memory comprising the data associated with the respective voxel into a cache memory in case the respective memory line is not already present in said cache memory and processing said data associated with the respective voxel for creation of said two-dimensional image, wherein during said choosing of sampling access patterns a block of sampling positions having a non-vanishing intersection with said grid is defined and wherein said group of sampling access patterns is restricted to the set of recursive subdivisions of said block.

In another aspect of at least one embodiment of the invention, choosing of a sampling access pattern further comprises the steps of recursively subdividing said block into sub-blocks; choosing a sub-block from a plurality of sub-blocks respectively resulting from subdivisions in several spatial dimensions for the next step of said recursive subdivision.

In accordance with a further aspect of at least one embodiment of the invention, during each step of the subdivision, the number of memory lines loaded for each of said respective resulting sub-blocks is approximated and the sub-block having the least number of memory lines loaded is chosen for the next step of said recursive subdivision. It is preferred that the number of memory lines loaded is approximated by determining the convex hull of the affine transformation of said block or sub-block into voxel space and calculating the area measure of the projection to a plane parallel to the plane of the tomographic cross sections created by means of a scanning device.

According to yet another aspect of at least one embodiment of the invention, the parallelepiped defined by the affine transformation of said block or sub-block into voxel space is determined and the sub-block resulting from the subdivision in the spatial dimension corresponding to the largest edge of said parallelepiped is chosen for the next step of said recursive subdivision.

BRIEF DESCRIPTION OF THE DRAWINGS

The above brief description as well as further objects, features and advantages of the present invention will be more fully appreciated by referring to the following description of a presently preferred but nonetheless illustrative embodiment in accordance with the present invention when taken in connection with the figures of the accompanying drawings, wherein:

FIGS. 7 and 8 illustrate block subdivisions in relation to the sampling indices.

DETAILED DESCRIPTION OF THE EXAMPLE EMBODIMENTS

Figure 1:
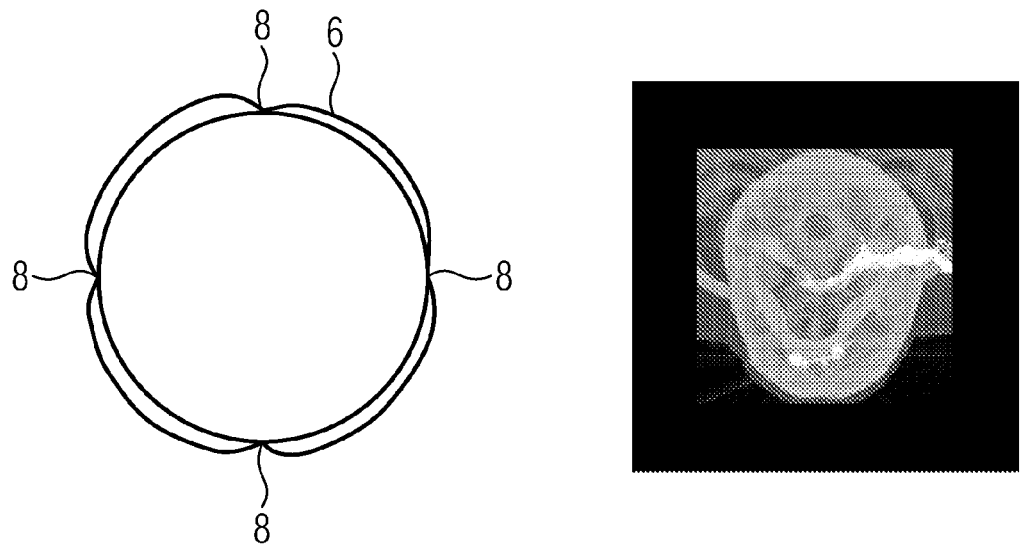
FIG. 1 illustrates the rendering time of an inplane rotation (left side) of an initial MIP image (right side) in polar coordinates.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," 2"comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Methods for efficient rendering of a two-dimensional image of an object in an imaging device are described herein. This is achieved by extending the sampling position access patterns along the regular grid to more general schemes.

The method described by an embodiment of the invention is not just an increment of existing volume sampling strategies, but is a novel major contribution to this field that opens new possibilities for many algorithms. An important advantage is that with the proposed method there is no longer the need to modify the volume data storage format in order to achieve excellent performance for all viewing directions, even with volumes stored as a linear slice array this can be achieved. An additional advantage of the invention is that it especially well benefits from recent CPU advancements like improved cache access, larger memory bandwidth and simultaneous multithreading (SMT). This will be demonstrated by comparing the performance of various approaches on an Intel Harpertown and a new Intel Nehalem CPU system. On a Nehalem system the method according to the invention was even considerably faster than an approach that used a swizzled volume. Since the number of cores, the SIMD vector width, the cache access handling as well as the memory bandwidth will continue to improve in the future, the method according to the invention will become even more interesting with upcoming next generation hardware, especially the upcoming Larrabee many-core CPU from Intel.

However, the method according to an embodiment of the invention does not necessarily require a linear slice array as volume data format; it will be further shown how to exploit the underlying idea for general volume formats. This could be used in cases where the volume data format is not under control of the developer, e.g. because it is predefined by the underlying hardware or when it is predefined by an external rendering subsystem software. Or it can be used to achieve exceptional viewing direction independence.

In the following it is first shown how to generalize the sampling access patterns and then the preferred embodiments of the method are described in detail.

Definition (set of sampling positions on the ray grid):

Let S be the set of all positions where the volume V has to be sampled. In the case of a regular arrangement of the sampling positions S, this set can be defined as a subset of a regular 3 dimensional grid $$G=\{p_{xyz}(i,j,k)|p_{xyz}(i,j,k)=i*v_x+j*v_y+k*v_z\},$$

where i, j and k are any integral numbers (integers that are positive, negative or zero). The vectors $v_x$, $v_y$ and $v_z$ do not need to be orthogonal, it is enough if they are linearly independent.

In case that the sampling is done to calculate a volume rendered image, the vectors $v_x$ and $v_y$ would define the pixel difference between pixels along the x and the y direction of the output image. The vector $v_z$ in this case becomes the sampling distance vector along rays that are shot through the image pixel positions. In case of an automatic volume registration algorithm using mutual information, the grid G would be defined by the voxel positions of the second volume that are to be registered. In the case of resampling a volume on which an affine transformation was applied, the grid would be defined by the voxel positions of the new volume that has to be generated.

The set of sampling positions S of interest are those positions of the grid G that lie within the interior of the volume V, so that all voxels that are necessary to be able to calculate the samples are lying within the volume.

Now that the set S is defined properly, one has to choose a sampling position access scheme, where an access scheme describes in which order the elements of S are sampled. In its most general form any permutation of the elements of S is one possible memory access pattern, however, such a definition would have drawbacks when it comes to volume rendering. During volume rendering rays are traversed from front to back or from back to front, because of that sampling position access patterns are restricted to those permutations of elements of S that reflect this property. Each pattern has to satisfy the property that when restricting the pattern to an arbitrary ray whose direction is defined by $v_z$—instead of using the whole set S—one arrives at a scheme that accesses the positions along this ray monotonically, e.g. from front to back. In the following traversal from front to back is assumed, the back to front case can be handled analogously.

Definition ($P_{Front}$):

Let $P_{Front}$ be the set of all permutations of the set S that satisfies the front to back index property along each ray defined by $v_z$. Each element of this set can be interpreted as an access pattern of the samples in S that describes the order in which the sampling positions are traversed. This sampling position access pattern defines a voxel access pattern for a given interpolation type (e.g. a trilinear interpolation) (see FIG. 1, described below in detail).

To minimize cache trashing, from all voxel access patterns (corresponding to a memory access pattern of the memory the voxel dataset is stored in) of the set $P_{Front}$, one now has to find the pattern where the number of cache misses becomes minimal.

The problems with this definition are

The optimization strategy will depend on lots of factors; each viewing angle can lead to a completely different solution for the optimum, so no pre-computation is possible here. Therefore, the optimization has to be done for each frame, so one needs a set that allows constructing the optimum access pattern in a very efficient way. The set $P_{Front}$ is not well suited for a fast construction of the optimal solution, finding the optimum here would be a discrete optimization problem that is very complex and time consuming.

To put it simple: The time to find the true optimum could be much larger than the gain one would get from the improved memory access pattern compared to an arbitrary memory access pattern.

Considering just one cache level is not sufficient. Usually there is not just one cache hierarchy, but multiple hierarchies, e.g. L1, L2 and L3 caches. A true optimum calculation would require that lots of internals of the cache hardware are taken into account, e.g. number of cache hierarchies, cache sizes and the access latency for each cache hierarchy.

An important achievement of the method according to an embodiment of the invention is that it is shown how to overcome these problems mentioned above by reformulating the general problem to find the optimum within the set $P_{Front}$ into a modified form that can be handled very efficiently. Our goal here is that the performance gain received by improving the memory access pattern should nearly completely arrive at the underlying algorithm that triggers the volume sampling.

Before the detailed description of a first preferred embodiment describing the method, some terminology used in the following is defined.

Definition (Block B):

Let B be a subset of the grid G that is defined by those elements $p_{xyz}(i, j, k)$ of G where $$i\in\{i_S,i_S+1,\ldots,i_S+2^X-1\}, j\in\{j_S,j_S+1,\ldots,j_S+2^Y-1\},$$
$$k\in\{k_S,k_S+1,\ldots,k_S+2^Z-1\}.$$

B is a 3 dimensional block of sampling positions of size ($2^X$, $2^Y$, $2^Z$) with the block starting index ($i_S$, $j_S$, $k_S$).

In the following, it is assumed one has a given block B of the grid G that is also a subset of the set of sampling positions S, which means it lies completely within the volume V. It will be shown later how to handle the case where this is not true.

There are 3 possible ways to halve such a block B; one can halve it in x, y or z direction, wherein x, y and z represent dimensions in the grid G. If B is halved in x direction, the resulting 2 sub-blocks will both have the size ($2^{X-1}$, $2^Y$, $2^Z$) and have the starting indices ($i_S$, $j_S$, $k_S$) and ($i_S+2^{X-1}$, $j_S$, $k_S$). When one halves in y direction the two sub-blocks will both have the size ($2^X$, $2^{Y-1}$, $2^Z$) and the starting indices ($i_S$, $j_S$, $k_S$) and ($i_S$, $j_S+2^{Y-1}$, $k_S$). Analogously, if one halves in z direction the two sub-blocks have the size ($2^X$, $2^Y$, $2^{Z-1}$) and the starting indices ($i_S$, $j_S$, $k_S$) and ($i_S$, $j_S$, $k_S+2^{Z-1}$).

The sub-blocks can be recursively subdivided as long as the block size along the subdivided direction is larger than 1. The limit of such a recursive subdivision of a starting block B is always a block consisting of a single sample position and size (1, 1, 1).

It is apparent that a general subdivision of blocks according to the invention could in general be applied to any block size, however, using a block size being an exponential of 2 has significant advantages because simple halving of a block can be done successively until a block size of (1, 1, 1) for each block has been reached.

Definition (sub-block hierarchy level):

The sub-blocks that result after one subdivision step are called sub-blocks of the first hierarchy level. The sub-blocks that result after a subdivision of a first hierarchy block are called sub-blocks of the second hierarchy level. By repeating this definition one can recursively define sub-blocks of arbitrary hierarchy levels. When applying a recursive subdivision of the block B, each time one subdivides, the same subdivision type on each sub-block of the same hierarchy level is applied. This guarantees that all sub-blocks of the same hierarchy level have the same size and form; they just have different start indices.

Since all sub-blocks of the same hierarchy level have the same size, one can formulate the following definition:

Definition (3-ary block subdivision):

Lets identify a block halving in x direction with the number 0, a block halving in y direction with the number 1 and a block halving in z direction with the number 2. Using this definition, a recursive subdivision of a block B to blocks of size (1,1,1) can be expressed by a 3-ary number.

Definition ($P_{Front\_Sub}(B)$):

Given a block B, the subset of $P_{Front}(B)$ that can be expressed by such a 3-ary number of a recursive subdivision for B is in the following called $P_{Front\_Sub}(B)$ (see FIGS. 2, 3 and 4).

For a block B of size ($2^X$, $2^Y$, $2^Z$), each 3-ary number within $P_{Front\_Sub}(B)$ has the property that the digit 0 appears X times, the digit 1 appears Y times and the digit 2 appears Z times. Therefore, the number of the elements within the set $P_{Front\_sub}(B)$ can be calculated as $$|P_{Front\_Sub}(B)| = \frac{(X+Y+Z)!}{(X!)*(Y!)*(Z!)},$$

where n! denotes the factorial of n.

For example, assuming that B is a block of size 2×2×2, the set $P_{Front\_Sub}(B)$ consists of the six 3-ary numbers 012, 021, 102, 120, 201 and 210.

Each recursive subdivision specified by a 3-ary number as described by the method of an embodiment of the invention naturally defines access patterns. Due to the symmetry, for each of those recursive subdivisions, there are some remaining degrees of freedom regarding the starting point and the order in which the resulting sub-blocks are accessed. In general, one could even exploit this symmetry by determining a sub-block accessing order dynamically in each of the steps of the recursive subdivision. However, this yields an additional complexity. For simplicity reasons, in the following a starting point for the access pattern for each of the resulting sub-blocks is specified by simply choosing a left-to-right and bottom-to-top accessing order. With this choice, each recursive subdivision, i.e. each 3-ary number specifies exactly one single accessing pattern.

Instead of searching for an optimal solution in the set $P_{Front}(B)$, the method according to an aspect of the invention restricts the search to the subset $P_{Front\_Sub}(B)$, which can be handled much more efficiently than the full set, but is still a very large subset that leaves a huge amount of degrees of freedom, since $|P_{Front\_Sub}(B)|$ rapidly increases when increasing the block size of B.

When constructing the sampling access pattern, which is equivalent to determining the according 3-ary number, one has to decide for each digit which of the 3 possible subdivisions should be chosen. These decisions massively influence how many cache memory lines are touched by the resulting sub-blocks, which in the end determines the overall number of cache misses of the memory access scheme. Therefore, knowing the number of touched cache lines when sampling a block B is the key to construct the searched sampling pattern within the set $P_{Front\_Sub}(B)$.

The number of cache lines that are touched at least once when doing a sample operation on all sampling positions of a block B depends to a major degree on the size and form of the block, but also to a minor degree on the concrete position of the block start indices. This slight influence of the block start position has to be eliminated when searching within the set $P_{Front\_Sub}(B)$ in order to arrive at a fast construction method.

To be able to eliminate this dependency, an average cache measure function is introduced. This approach allows to handle all blocks of the same hierarchy level equally, which will allow to define an efficient optimization algorithm.

Definition (average cache measure function $f(B)$):

The average cache measure function $f(B)$ is defined to be the average of all cache measure functions for a block B across all theoretical block start positions. Here, a cache measure function measures the number of cache lines that are touched at least once when doing a sample operation on the sampling positions of a block of size B. It is a function that maps the block B onto a real number that is >=0. This function by definition just depends on the size and form of the block B, but not on its concrete start indices within the grid G.

Theoretically one could approximate the average cache measure function for a block B by calculating the number of touched cache memory lines for a predefined set of block start positions and average the result. However, there is also an analytical way to directly calculate such an average cache measure function. In the following such an analytical function is derived for the case where the volume is stored as a linear slice array.

When doing volume rendering, an important concept that is used often is to work not in the world coordinate system directly, but to transform this space into the voxel space. In voxel space each voxel has the size 1×1×1 and the primary axes of the volume dataset are oriented along the x, y and z-axis of the voxel space coordinate system. In the following, this definition is used.

Algorithm (Analytical Cache Measure Function for Volumes Stored as a Slice Array):

On most processor hardware, when a voxel is accessed then not just this voxel is loaded into a cache, but the whole cache line (typical CPU cache lines have 64 or 128 bytes). If hardware prefetching is available, also the additional neighbouring cache lines are loaded into a cache. For a volume that is stored as a slice array this means that when fetching a voxel, a large amount of neighbor voxels that have the same y-z coordinates in voxel space are fetched. Hence, the number of touched cache lines is basically already described by the area of the projection of all touched voxels onto the y-z coordinate plane in voxel space. This property is the key to the analytic cache measure function for linear slice arrays according to an aspect of the invention.

Figure 6:
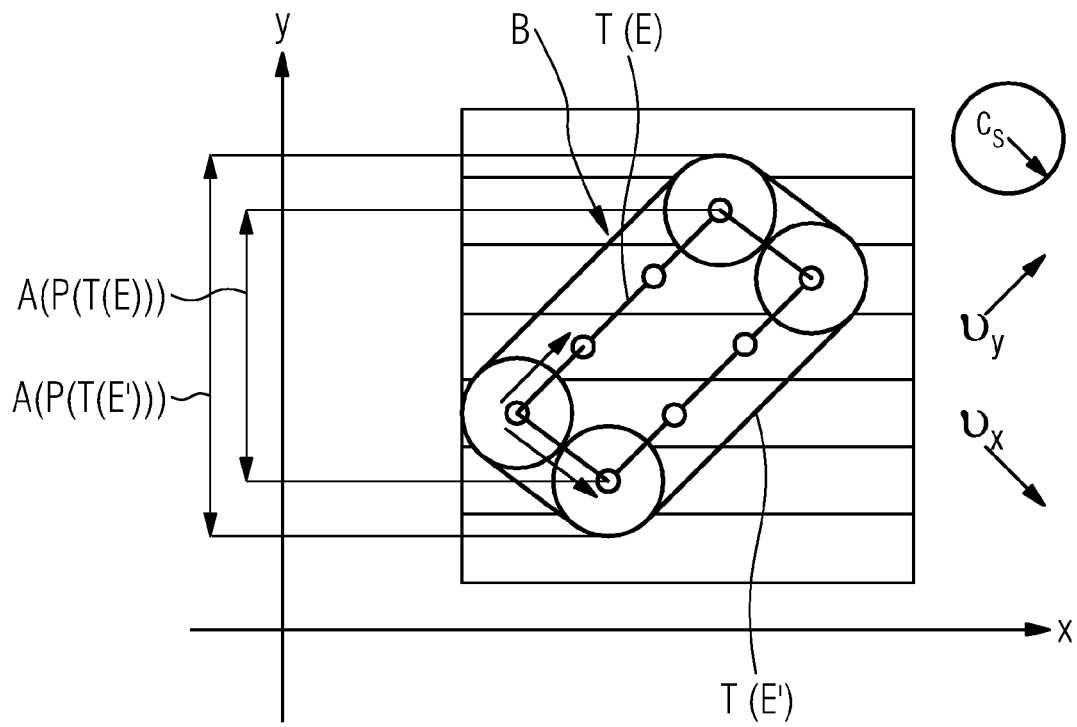
FIG. 6 illustrates the analytical average cache measure $f(B)$ for the two-dimensional case.

Projecting the touched voxels would be a step that is dependent of the start position of the block, therefore the block B is interpreted as a volume in 3 dimensional space that is defined by the convex hull of the sampling positions and one arrives at the analytical cache measure function by projecting this convex hull onto the y-z plane and using the 2 dimensional area as measure function (see FIG. 6).

This allows to calculate the average measure very efficiently; one just has to do a linear transformation of the block B into voxel space, project the convex hull of this transformed block onto the y-z plane and then calculate the area measure of the result.

Let T be the affine transformation that maps the coordinate system in which the grid G is defined into voxel space. Let P be the projection operator that projects the voxel space onto the y-z plane, then the formula for the average cache measure function $f(B)$ can then be formulated as $$f(B)=A(P(T(E))),$$

where A is the measure operator that calculates the area of a 2 dimensional object within the y-z-plane. Let B be a block of size $(2^X, 2^Y, 2^Z)$, then in this formula E is defined as the parallelepiped defined by the 3 vectors $(2^X-1)v_x$, $(2^Y-1)v_y$, and $(2^Z-1)v_z$, which span the convex hull of the sampling positions in B. Since E is a parallelepiped, the area of the projection can be calculated very efficiently:

Let $p_x=P(T((2^X-1)v_x))$, $p_y=P(T((2^Y-1)v_y))$ and $p_z=P(T((2^Z-1)v_z))$ be the projection of the edges of the parallelepiped in voxel space using P, then the area becomes $$f(B)=A(P(T(E)))=|p_x \times p_y|+|p_x \times p_z|+-p_y \times p_z|.$$

A nice side effect of this simplified measure function is that no exact cache line size has to be known.

This formulation does not take into account that depending on the concrete volume sample type the size of the voxel neighbourhood that influences the result varies in size. Assuming that the influence can be approximated by a sphere with radius $c_X$, one can enlarge the parallelepiped E to a new object E' where this set is defined as $$E'=\{p|c_S \geq p-x_M| x_M \in E\}.$$

Therefore, when taking the sampling neighbourhood into account one arrives at the following measure function $$f(B)=A(P(T(E'))).$$

For the abovementioned parallelepiped this leads to the general cache measure function $$f(B)=A(P(T(E')))=|p_x \times p_y|+|p_x \times p_z|+|p_y \times p_z|+2c_S(|p_x|+|p_y|+|p_z|)+c_S^2\pi.$$

Since the cache measure function is used to decide which of the 3 possible sub divisions leads to minimal $f(B)$, the constant $c_S^2\pi$ does not have to be taken into account for that decision, allowing to use $$f(B)=|p_x \times p_y|+|p_x \times p_z|+|p_y \times p_z|2c_S(|p_x|+|p_y|+|p_z|).$$

A good approximation for the constant $c_S$ is to use half of the support diameter of the sampling operation in voxel space. For a trilinear interpolation the support of one sampling step consists of eight voxels that form a cube of size 1×1×1 in voxel space. The diameter of this cube is $\sqrt{3}=1.732$, therefore one can preferably assume here $c_S \approx 0.86$, which is used in the trilinear sampled examples.

Having defined the set $P_{Front\_Sub}(B)$ and the measure $f(B)$, one can now define the algorithm that constructs the voxel access pattern, i.e. the memory access pattern. To allow a very fast computation of the optimal memory access pattern one does not search the theoretical optimal solution within the subset $P_{Front\_sub}(B)$ but exploits its subdivision structure.

Algorithm (Dynamic Case, Memory Access Pattern $p_{Opt}$, for a Single Block):

When subdividing a block B, we calculate which of the 3 possible resulting sub-block sizes has the smallest measure value. The sub-block with the smallest measure defines which of the 3 possible subdivision steps is done. A subdivision is only taken into account when the block size in that direction is larger than 1.

By doing this decision step for each subdivision, we arrive at the memory access pattern $p_{opt}$ from the set $P_{Front\_Sub}(B)$. Each subdivision decision then defines one digit in the 3-ary number that describes $p_{opt}$ (see FIG. 8).

In case that two subdivision orientations produce the same measure value, one could choose any of those orientations. In order to arrive at a fully defined algorithm, an implicit order for such cases is defined, where z has highest priority, followed by y and finally x. Any other implicit order for such cases would also be acceptable.

In the following, some of the properties of the memory access pattern $p_{opt}$ and the set $P_{Front\_Sub}(B)$ are analyzed:

A) Each subdivision block on each hierarchy level has the property that all of its sampling point indices form a continuous sequence within the memory access pattern $p_{opt}$ so that no sampling position of another block lies in-between. Since in each subdivision step, that solution of the 3 possible subdivisions that requires the smallest number of cache lines is chosen to handle the sampling of the sub-block, it is guaranteed that the memory access pattern $p_{opt}$ is designed to keep sampling positions that have a large cache overlap close together in the memory access sequence.

B) Because of its hierarchic subdivision structure, the memory access pattern proposed according to an aspect of the present invention does not just optimize for a single predefined cache size, but optimizes all underlying cache hierarchies in parallel. Assumed one has multiple cache hierarchies L1, L2 up to Ln, with different size and latency, then for each cache hierarchy size there is a block subdivision level so that its block size fits into the cache. This basically means that the memory access pattern according to the invention is designed to try to keep as many sampling data as possible within a high cache hierarchy level as long as possible.

C) The proposed method is cache oblivious, which means it is not necessary to know the cache sizes of the underlying hardware or the number of cache levels, since the cache sizes and the number of cache levels are not used explicitly in the method. There is no risk that a wrong assumed cache size completely breaks the memory access performance, which makes the method very robust here and guarantees excellent performance for the general case. If the block size is made larger and larger at one point one does no longer get an additional benefit from this strategy, since then low hierarchy levels no longer fit into the largest cache, but one still gets the benefit from the higher hierarchy levels. This property is not fulfilled by bricking approaches according to the prior art. Here, when choosing the brick size too large this can break the performance of the algorithm completely.

D) The set $P_{Front\_Sub}(B)$ has many convenient properties compared to the full set $P_{Front}(B)$; nevertheless this set is still very large and hence leaves still an enormous amount of degrees of freedom when optimizing, which is an important property when restricting a set that serves as base for optimizations to one of its subsets.

E) To exploit the available caches it is preferable that the optimal memory access pattern tries to keep indices of neighbor samples close together. When one restricts the set to the set $P_{Front\_Sub}(B)$ one chooses a subset that is designed so that all of its members satisfy this important property.

F) When sampling blocks within a regular grid, a key assumption is that only the size and form of a block has a major influence, while the block start indices influence is taken into account as an average. This fact is the key assumption to allow a very fast computation of the method according to the invention. The memory access pattern $p_{opt}$ fully reflects this assumption. All sub-blocks that are on the same hierarchy level not just have the same size and form, but also all the indices of the sample positions within each sub-block are exactly the same when calculated modulo the number of the samples of the sub-block. This means the memory access patterns of all sub-blocks of a hierarchy level are basically equal and just differ by translation. In this local index definition, the sub-block indices are described by a truncation of the 3-ary number.

G) With its hierarchic block structure the method according to the invention is naturally well suited for exploiting SIMD instructions efficiently (data parallelism) and allows naturally a multi-processor implementation (thread parallelism).

Algorithm (General Block Case):

So far it was assumed that each block B of sampling positions fully lies within the volume, in case that this is not true one has to take care not to access samples that lie outside the volume. Also in this case, the same block structure is used; the only difference is that those indices of the memory access pattern that lie outside are skipped.

Algorithm (Adding Empty Space Skipping):

Simple examples of empty space skipping are clip-planes and crop-boxes that analytically remove parts of the volume. Another typical example is the empty space skipping that occurs when rendering a VRT. Here, regions of the volume that have zero opacity can be ignored since they do not contribute to the result image. Empty space is also often defined using binary volumes that result e.g. from volume segmentations.

Such an empty space skipping can be very easily integrated, since the method according to the invention works completely in image space. Instead of defining S to be the set of all grid positions that are inside the volume V, one simply has to remove from S those sampling positions where the sampling step only touches volume data that lies completely within the empty space.

This empty space skipping can be done efficiently as follows:

First all rays inside the tile are clipped against the volume V, producing a start and an end index for each ray when the ray intersects the volume. In case it does not intersect the volume the ray can be ignored. In a second step one can take additional empty space skipping into account by modifying the start and end indices for the rays. The set S is then defined by the set of start and end indices for all rays.

Up to this point, the method according to an embodiment of the invention for a single block B has been described. Of course one could already in theory use this approach to solve the problem to calculate all samples S that lie on a given regular grid and are inside a given volume, but this would not be optimal:

A single block approach would require additional effort in order to decompose the algorithm to run on multi-processor hardware A large part of the samples of this single block would likely be outside of the volume, increasing the number of samples that have to be skipped If one makes the block size larger and larger at one point one does no longer get an additional benefit, since the hierarchy levels with large sub-blocks no longer consist of blocks that completely fit into the largest cache. On the other side really large blocks could lead to an overhead within the algorithm that becomes noticeable.

In the following, a further embodiment that overcomes these issues is described in detail:

Algorithm (Restrict Maximal Block Size, 3D Block Rasterization):

The size of the largest block B is restricted so that the overhead of the subdivision scheme for that block can be neglected compared to the sampling of the whole set S (e.g. a block size of 32×32×32). Then a set of blocks of the same size as B is determined that do not overlap but contain all samples S, and hence reduce the given sampling problem to a problem that can be formulated just with blocks that have the same size as B. This can be seen as a 3 dimensional rasterization problem that is similar to the 2 dimensional rasterization problem being part of the graphics pipeline. During the 2D rasterization step, one determines which pixels on the screen contribute to the image and which can be ignored. In the present invention one is dealing with 3D blocks instead of 2D pixels.

In the case that the sampling is used for volume rendering, the following tile strategy allows a fast block rasterization:

The result image is divided into tiles, each tile can be handled independently of the other tiles which allows to handle different tiles by different threads. This approach is well suited to allow thread level parallelism for multiprocessor scenarios. Each thread then handles all rays that are necessary to determine the according tile part of the result image. To make the 3D block rasterization part as simple as possible one should choose a blocksize for B so that the x-y size of the block is identical with the tile size. Within a tile this means that block rasterization only has to be done along the z-direction.

Let the tile have the size $(2^X, 2^Y)$ and the block B have the size $(2^X, 2^Y, 2^Z)$. Let B(k) be a block that has the same size as B and starts at the position $k*2^Z*v_z$. The set of all such blocks B(k) than describe all sampling positions of the grid G that are within the tile, so we just have to determine which indices k produce blocks that contain sampling positions of S.

Figure 13:
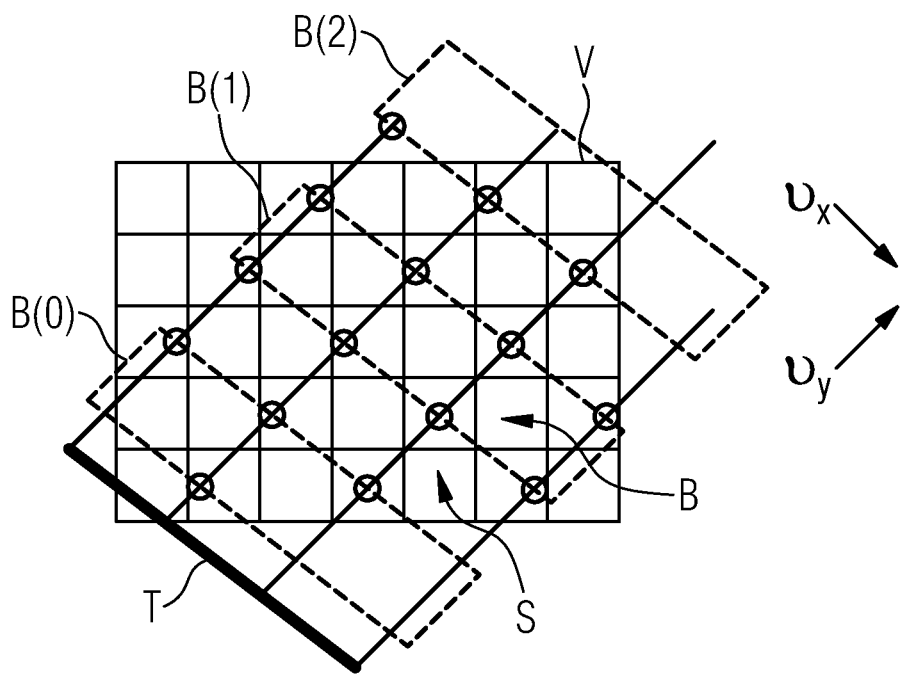
FIG. 13 illustrates block rasterization in 2D.

Once the start and end indices for each ray that build up the set S are known, one can determine the minimal k_min and maximal k_max indices of B(k) that partially contain sample positions (see FIG. 13).

In case that there are other purposes beside volume rendering, the same 3D block rasterization can be done as in the volume rendering scenario, with the difference that one does not have to store result data into the tile, but just use the tile as an entity for defining a block rasterization.

Static Case for Arbitrary Volume Data Formats:

So far it was assumed that the volume dataset is stored in a linear slice array so that one can exploit this knowledge dynamically during the sampling step. In some cases one might have to work with other volume formats, e.g. volumes that are stored in a block format or are swizzled. This could for example occur when using a third party rendering subsystem or when using hardware that internally requires some special volume format that is stored in an optimized format. In some cases one might not even know what exact volume format is used, e.g. when the volume is stored as texture than the driver might be using an internal format that is hidden.

In such cases where the volume data format is already stored in an optimized format, there is a different situation as in the dynamic case. Here, one can often assume that the volume format already reduces the orientation dependency and so one can assume that no orientation in voxel space is preferred against the other directions. In this scenario, the decision which of the 3 subdivision directions should be chosen can be formulated in a simplified way, described in the following alternative embodiment of the invention.

When there is no preferred direction, a good general strategy to minimize cache misses in the set $P_{Front\_Sub}(B)$ is to keep the parallelepiped of all the sub-blocks in a form that is close to a cube. In each subdivision step one simply subdivides that dimension of the block B that corresponds to the largest edge size of the parallelepiped that is defined by the convex hull of the sampling positions of B.

A nice property of this approach is that the resulting 3-ary number is independent from the viewing direction, as long as the lengths of the vectors $v_x$, $v_y$ and $v_z$ do not depend on the viewing orientation. In this case one just has to calculate the 3-ary number once and not each time the viewing direction is modified, and one arrives at a static optimization where $p_{opt}$ stays constant (see FIG. 12).

Lets assume a block B has the same size in each edge direction and the vectors $v_x$, $v_y$ and $v_z$ have all the same length, then some possible schemes one arrives at are those where the 3-ary number is defined by a 3 digit block out of the set (012, 021, 102, 120, 210, 201) that is applied periodically. For the 3 digit block 210 one arrives at the static 3-ary number 210210210210 . . . , for 012 one would arrive at 012012012012 . . . , all such resulting numbers can be interpreted mathematically as schemes that are well suited to be used for volume data swizzling when applied on volume voxels instead of sampling positions. While being something completely different, one swizzling operates on voxels while the other operates on sampling positions, the mathematics behind are fully identical.

Figure 31:
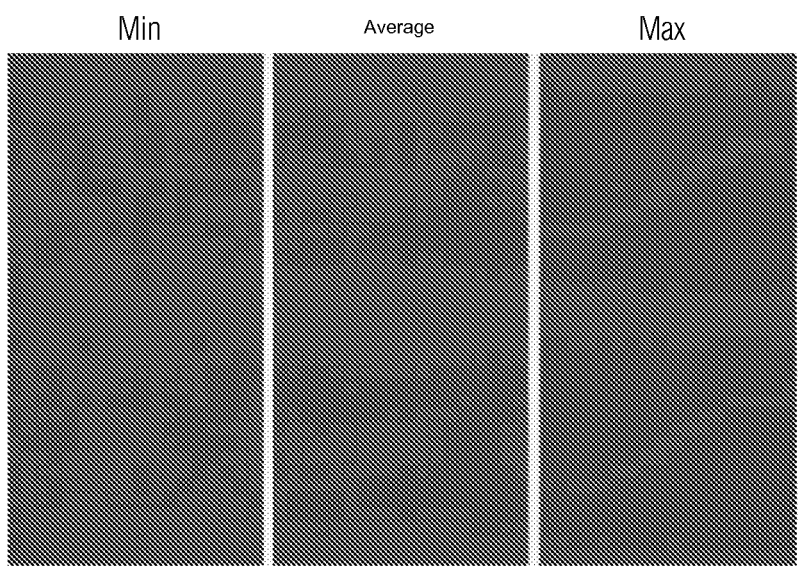

This leads us to an even simpler way to arrive at a static scheme according to a further embodiment: One can predefine a 3-ary number that is defined by alternating the digits and results form the described static case above by assuming that the block describes a parallelepiped E that is a cube. Such a static scheme then predefines the 3-ary number as e.g. 210210210210 . . . , instead of calculating a 3-ary number statically by analyzing the length of the parallelepiped edges. (see FIGS. 21, 26 and 31)

Extension to Arbitrary Dimensions:

The proposed block subdivision, the dynamic case as well as the static case, not just works for 3D, but for any dimension n. For an n-dimensional sampling grid one then arrives at n-ary numbers instead of 3-ary numbers. For a 2 dimensional planar grid one would therefore arrive at binary numbers. The planar case arises e.g. when resampling 2 dimensional images on which one has applied an affine transformation.

Implementation details for calculating the optimal sampling pattern of a block B dynamically:

In the following embodiment, it is described how one can calculate the 3-ary number that describes the optimal memory pattern in the dynamic case and the resulting sampling position access scheme using pseudo code.

1.) Do a linear coordinate transformation of the grid vectors into the voxel space coordinate system resulting in the 3 dimensional vectors vX, vY and vZ. In voxel space each voxel has the size 1×1×1.

2.) For a fixed block B of size ($2^X$, $2^Y$, $2^Z$) determine the 3-ary index number of the optimized sampling pattern. This number has x+y+z digits, in pseudo code the calculation of the 3-ary number can be formulated as

```
int aSize = x+y+z;
for (i=aSize-1; i>=0; i--)
{
    int aPotX = 1<<x;
    int aPotY = 1<<y;
    int aPotZ = 1<<z;
    if (x>0)
        aMeasureX = CalculateMeasure(aPotX/2, aPotY, aPotZ, vX, vY, vZ);
    if(y>0)
        aMeasureY = CalculateMeasure(aPotX, aPotY/2, aPotZ, vX, vY, vZ);
    if(z>0)
        aMeasureZ = CalculateMeasure(aPotX, aPotY, aPotZ/2, vX, vY, vZ);
    ...
    Determine which block halving results in the smallest measurement
    ...
    if (optimal block halving was in x direction)
    {
        3-ary-number[i] = 0;    // Next digit in 3-ary number is 0
        x--;
    }
    if (optimal block halving was in y direction)
    {
        3-ary-number[i] = 1;    Next digit in 3-ary number is 1
        y--;
    }
    if (optimal block halving was in z direction)
    {
        3-ary-number[i] = 2;    Next digit in 3-ary number is 2
        z--;
    }
}
```

The method CalculateMeasure( ) here represents the average cache measure function. The result of this pseudo code is a 3-ary number, here represented as an array.

3.) The calculated 3-ary number uniquely describes a mapping from the set of numbers $$I = \{0,1,2,\ldots,2^{X+Y+Z}-1\}$$

to the sampling positions of the block B, so use the 3-ary result number to recursively calculate that mapping. Each sampling position is determined by its x, y and z integer value, so this mapping data can be stored within 3 arrays. In pseudo code this part can be formulated in a recursive form as

```
void createMapping(int& aArrayIndex, unsigned short
aBlockIndexX, unsigned short aBlockIndexY, unsigned short
aBlockIndexZ, int aBlockLogX, int aBlockLogY, int aBlockLogZ)
{
    int aLogSum = aBlockLogX+aBlockLogY+aBlockLogZ;
    if (aLogSum > 0)
    {
        ...
        // Retrieve the current 3-ary-digit that
        corresponds to aLogSum
        3-ary-digit = 3-ary-number[aLogSum]
        ...
        If (3-ary-digit is 0)
        {
            createMapping(aArrayIndex, aBlockIndexX,
                aBlockIndexY, aBlockIndexZ, aBlockLogX-1,
                aBlockLogY, aBlockLogZ);
            int BLOCK_SIZE_X = 1<<aBlockLogX;
            createMapping(aArrayIndex,
                aBlockIndexX+BLOCK_SIZE_X/2, aBlockIndexY,
                aBlockIndexZ, aBlockLogX-1, aBlockLogY,
                aBlockLogZ);
        }
        else
        If (3-ary-digit is 1)
        {
            createMapping(aArrayIndex, aBlockIndexX,
                aBlockIndexY, aBlockIndexZ, aBlockLogX,
                aBlockLogY-1, aBlockLogZ);
            int BLOCK_SIZE_Y = 1<<aBlockLogY;
            createMapping(aArrayIndex, aBlockIndexX,
                aBlockIndexY+BLOCK_SIZE_Y/2, aBlockIndexZ,
                aBlockLogX, aBlockLogY-1, aBlockLogZ);
        }
        else
        If (3-ary-digit is 2)
        {
            createMapping(aArrayIndex, aBlockIndexX,
                aBlockIndexY, aBlockIndexZ, aBlockLogX,
                aBlockLogY, aBlockLogZ-1);
            int BLOCK_SIZE_Z = 1<<aBlockLogZ;
            createMapping(aArrayIndex, aBlockIndexX,
                aBlockIndexY, aBlockIndexZ+BLOCK_SIZE_Z/2,
                aBlockLogX, aBlockLogY, aBlockLogZ-1);
        }
    }
    else
    {
        indexArrayX[aArrayIndex] = aBlockIndexX;
        indexArrayY[aArrayIndex] = aBlockIndexY;
        indexArrayZ[aArrayIndex] = aBlockIndexZ;
        aArrayIndex++;
    }
}
```

When called with
createMapping(0, 0, 0, 0, X, Y, Z)
this will create a mapping from the set of all numbers I to the x-y-z block indices of all sample points of Block B, where the arrays indexArrayX, indexArrayY and indexArrayZ then contain the x-y-z indices relative to the block start position.

To each index $i \in I$ one therefore can assign a sample position within the block B, where this position is defined by the tuple of values indexArrayX[i], indexArrayY[i] and indexArrayZ[i]. An iteration of i from 0 to $2^{X+Y+Z}-1$, therefore produces the sequence of local sampling positions that is described by the 3-ary number. This pseudo code is recursive and is illustrated for its simplicity, for an efficient implementation an explicit variant using loops is used.

For simplicity reasons, in this pseudo code the x-y-z indices of the sampling position are stored, which allows to calculate the sampling position. Depending on the exact application one could here also pre-calculate additional info that is required later during sampling, in order to minimize the overhead of this mapping.

For example, in the example implementation the sampling position is directly calculated here already and these 3 dimensional point positions are stored, so that when later the sampling positions are accessed directly without having to recalculate it for every index i. In the case of volume rendering, the x and y indices indexArrayX[i], indexArrayY[i] define the relative position in the result image. In the volume rendering example this has been exploited and also the relative index was directly stored in the result image instead of the x and y coordinates.

So overall instead of storing these three block indices as described here, in the example implementation, the 3 dimensional relative position represented by three float values and the relative position of the pixel of the result image that is affected by the sample position is stored as a (short) integer. It depends on the hardware if it is faster to just store the three indices or to store already more information as e.g. the sampling positions.

Using SIMD for sampling a block B using the optimal sampling pattern:

When having calculated the mapping from the set I to the local sampling positions of a block B, the sampling of each of the blocks that are touched by voxels of S can be done very efficiently. The set I is now divided into contiguous parts J(i) that all have a size of $2^R$, resulting in $2^{X+Y+Z-R}$ of such subsets. The subset J(i) here contains those indices that range from $i*2^R$ to $(i+1)*2^R-1$.

Let B(J(i)) in the following be a subset of B describing the set of local sampling positions that are defined by the indices J(i). Since the size of J(i) is a power of two, the subset B(J(i)) forms a sub-block of a hierarchy level of the block B. The local indices within the sub-block B(J(i)) are defined by the last R digits of the 3-ary number that describes the sampling pattern of B.

This sampling can be efficiently done on hardware that allows fast calculations for data parallel processing. One example here is hardware that has SIMD operations, e.g. CPUs that support SSE (R=2), AVX (R=3), or the upcoming Larrabee instruction set LRBni (R=4). Another example is hardware that allows highly parallel processing of data like e.g. GPUs that are programmed with CUDA or OpenCL.

On hardware that supports fast handling of data parallel processing the sampling of the sub-block B(J(i)) can be done in parallel. The sampling of the whole block B can be achieved by iteratively handling all sub-blocks B(J(i)) by iterating the index sets J(i), so the sampling part itself allows naturally a massive parallel computation.

SIMD allows to minimize the index mapping overhead for a block B:

When using SIMD operations for sampling, the set I is iterated in contiguous parts J(i) that all have a size of $2^R$. This can be exploited when calculating the mapping from I to the according sampling positions of a block B. One does not have to calculate this mapping for the whole 3-ary number resulting in $2^{X+Y+Z}$ values, but can do this only for the 3-ary number where the last R digits do not have to be taken into account, resulting in $2^{X+Y+Z-R}$ values. Besides of this, one just once calculates the index mapping for the local indices of a block consisting of the last R digits. This basically is equivalent to not calculating this info for all sampling positions but just for the start indices of all sub-blocks B(J(i)). Knowing the start indices of these sub-blocks is enough when using SIMD, since the local indices within the blocks B(J(i)) are the same for all i and it is therefore enough to calculate this local data just once instead of calculating this for every block B(J(i)). This greatly helps to minimize the calculation overhead when creating the mapping from I to the according sampling position of a block B, since it reduces the number of positions that have to be taken into account during the index mapping calculations from $2^{X+Y+Z}$ to $2^{X+Y+Z-R}$. So the larger R becomes, the less overhead is created here.

Restricting $P_{Front\_Sub}(B)$ to the subset $P_{Front\_Sub}(B,R)$:

The sampling is usually embedded into an algorithm that further processes the sampling result, e.g. uses the result value for volume rendering or uses the result to construct mutual histograms in case of volume registration based on mutual information. To allow optimal performance using SIMD for both parts, one has to take care to avoid steps that require to be handled sequentially.

So far it has been only assumed that optimization is performed within the full set $P_{Front\_Sub}(B)$, but when not just looking onto the sampling part but also on how the samples are used by the algorithm where the sampling is embedded into, sometimes one can achieve better performance when reducing this set $P_{Front\_Sub}(B)$ to a sub-set as is done in the following embodiment. By reducing this set one decreases the flexibility to construct the solution which reduces the cache properties of the solution to some degree, but the idea is here to gain advantages that outweigh this flexibility disadvantage.

Assuming one is using the sampling as part of a volume rendering algorithm, as mentioned above the local indices within the sub-block B(J(i)) are defined by the last R digits of the 3-ary number that describes the sampling pattern of B. If these R last digits do not contain the digit 2 then the whole additional processing within the volume rendering algorithm that uses the samples can also be done in parallel. It only has to be guaranteed that the blocks B(J(i)) are handled with a monotonically increasing i because of the front to back traversal of the rays.

In case the last R digits contain the digit 2, then one has to add a sequential part at least partially. How large this sequential part is depends on the number of digits that do contain the digit 2. If all last R digits contain the digit 2 then the $2^R$ results would have to be processed fully sequentially.

Definition $P_{Front\_Sub}(B,R)$:

Let the set $P_{Front\_Sub}(B,R)$ be defined as the subset of $P_{Front\_Sub}(B)$ where the last R digits do not contain the digit 2. This subset $P_{Front\_Sub}(B,R)$ plays an especially important part in the following, because of its property to all full SIMD parallelism not just for sampling but also for the processing of the sampling results (see FIG. 5).

In case that R is too large and it would not be possible to use the set $P_{Front\_Sub}(B,R)$ one should take care to at least minimize the occurrence of the digit 2 in the last R digits.

Example

In case one uses SSE operations to exploit the parallelism, we can handle 4 float operations in parallel and hence arrive at R=2. All sampling patterns in $P_{Front\_Sub}(B,2)$ have the property that not just the sampling can be done using SSE, but also the rendering calculations that use the sampled values.

In the test implementation where the SSE instruction set was used, the dynamic as well as the static sampling patterns were all contained within the set $P_{Front\_Sub}(B,2)$.

Restricting to subsets that do not need pre-calculated index mappings.

Restricting the set $P_{Front\_Sub}(B)$ to a subset by adding constraints on the last R digits is a very interesting possibility. Another preferred embodiment worth mentioning are subsets that lead to index mappings that can be calculated on the fly and do not require to create the mapping from I to the according local sampling positions of a block B by storing the local block indices in arrays. One example of a block that allows calculating its local indices directly are those where the digits 0, 1 and 2 in the 3-ary number occur in a sequence.

Example

For a block B of size $(2^X, 2^Y, 2^Z)$ with X=4, Y=4, Z=4 the set $P_{Front\_Sub}(B)$ could be restricted to the set where the 0, 1 and 2 digits occur in a sequence. This subset would consist of the numbers {222211110000, 222200001111, 111100002222, 111122220000, 000022221111, 000011112222}.

In this simple form the restriction would be too large, but one can extend this described approach hierarchically. One can describe that sub-blocks of a given hierarchy level should consist of such a form, while the sub-blocks itself are organized in such a form.

Example

For a block B of size $(2^X, 2^Y, 2^Z)$ with X=4, Y=4, Z=4 the set $P_{Front\_Sub}(B)$ could be restricted to the set where the 0, 1 and 2 digits occur in a sequence for the last 6 digits and also for the first 6 digits. This subset would consist of the numbers {221100221100, 221100112200, 221100002211, . . . }

The interesting property of such subsets is that the mapping from I to the according local sampling positions of a block B could be calculated on the fly using nested loops. This fact can be very interesting in cases where one wants to exploit this simple sampling while staying close to the advantageous properties of the proposed subdivision based approach.

Algorithm (Efficient Skipping of Block Positions that do not have to be Sampled):

The blocks B(k) of the block rasterization can be separated into two classes: In the first class all positions within the block lie within the set S, in the second class there exists at least one sample that is not part of S. In the first case it is known that all positions have to be sampled and no additional checks have to take place. In the second case one has to take care when calculating the samples to efficiently skip those block positions that are not part of S. A simple solution would be to test for each sampling position if it is inside the start and end index range of its ray; however this is not optimal since it would require range tests for each position within the block. One can avoid most of this work by exploiting that one samples a whole sub-block B(J(i)) of sampling positions in parallel and not sequentially ray by ray. One therefore creates additional block info from the start and end indices to speedup this test.

During volume rendering a sub-block B(J(i)) influences only some pixels in the result image. Let T(B(J(i))) describe the set of pixels in the result image that are affected by the set of indices J(i). This set T(B(J(i))) is a sub-tile of the result image.

To speed up the skipping of positions that do not have to be sampled, the tile is divided into sub-tiles of the size T(B(J(i))) and for each sub-tile the following four index values are stored:

StartFull=Max of all start index values of all rays within the sub-tile
StartPartial=Min of all start index values of all rays within the sub-tile
EndPartial=Max of all end index values of all rays within the sub-tile
EndFull=Min of all end index values of all rays within the sub-tile These four values give us the following information:
There are no indices outside the index range between StartPartial and EndPartial for every ray in the sub-tile
Indices between StartFull and EndFull lie completely within the volume for every ray in the sub-tile This sub-tile information allows to speedup the skipping of positions within B that are not part of S. Instead of having to check the start and end indices for every ray one can skip most of these checks by being able to skip complete sub-blocks.

This is achieved by having a trivial reject and trivial accept case for a sub-block:
trivial reject: indices do not lie between StartPartial and EndPartial, nothing has to be done, these positions can be skipped
trivial accept: indices lie between StartFull and EndFull, no additional checks in the interior have to be done, since it is known that all positions have to be sampled.

Figure 15:
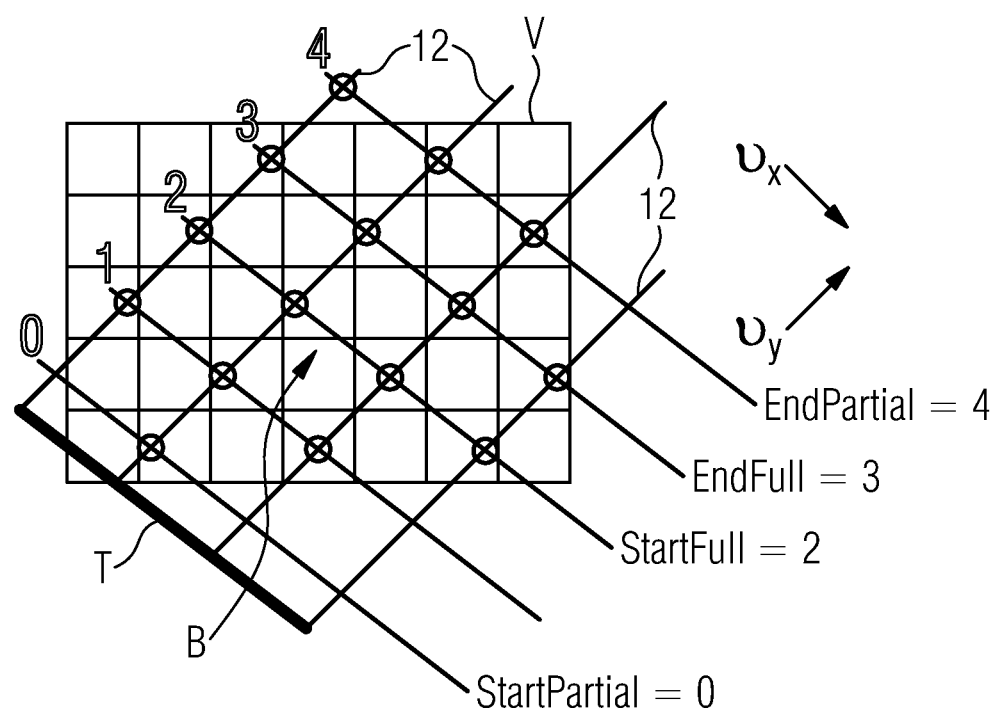
FIG. 15 illustrates the efficient skipping of blocks of sampling positions.

Only in the case where one is not in the trivial reject or trivial accept case one has to check in more detail what positions can be skipped (see FIG. 15).

The described procedure can naturally be done hierarchically. When having two nested sub-tiles one can do the trivial reject and trivial accept tests on the coarser hierarchy level and if no one becomes true one can do the trivial reject and accept test on the finer hierarchy level and only for those cases where also here no one is true one has to check for each ray. With such an approach the skipping of positions that do not lie within the set S can be done very efficiently.

Swizzling of the image tile for additional cache thrashing minimization:

So far only the cache thrashing that is caused by accessing volume data has been taken into account. While this is the major part that has to be optimized, this is not the only one. In case of volume rendering, there is a second source of cache thrashing that can not be fully neglected. When one has sampled B(J(i)) and used these samples to update the intermediate pixel data, cache misses can also occur when accessing the image pixel data of the tile. Assumed the pixel image data would be stored in a linear fashion, then tile accesses along the x-direction are much more likely to hit data that is already stored in a cache than accesses that occur along the y-direction. Since in the method according to the invention one more often has to update the pixel data compared to approaches that handle rays completely before switching to the next ray, these memory accesses also have to be taken into account, which is done in a further embodiment described in the following.

In the method according to an embodiment of the invention, the accesses to the image pixels occur in a fully defined way that is given by the 3-ary number. This info may be exploited to not just minimize cache thrashing because of volume sampling, but also the cache thrashing because of accessing pixel data. Instead of storing the tile pixel data in a linear way, the image data is stored in a swizzled format, where this 2D tile swizzling format can be derived from the 3D block swizzling format. As the block swizzling scheme can be represented by a 3-ary number, the tile swizzling format can be described by a binary number. The key idea here is that the digit 2 has a special meaning in the 3-ary number formulation. A subdivision that is described by this digit basically means that both created sub-blocks have exactly the same image access scheme. Taking this into account, the binary number for tile data swizzling is derived from the 3-ary number by removing the 2 digits from the 3-ary number, which can be interpreted as projecting the 3-ary block accesses to binary image accesses (see FIG. 14).

Instead of directly writing the pixel data into the result image, the pixel data is linearly stored in a local image that is therefore stored in a swizzled format. When all samples within the tile were done and the tile image data is updated completely, the swizzled tile image data is stored into the result image in the format that the result image requires.

The swizzling scheme can be stored very efficiently by taking the following into account:
Exploit the presence of SIMD to minimize the swizzling scheme overhead. As in the case when calculating the block index mapping it is enough to determine this swizzling scheme just for a binary number where the last R digits are not taken into account when one is using the set $P_{Front\_Sub}(B,R)$. Here, create the swizzling scheme for the last R digits just once.
When using swizzling for storing the volumes in a different format, one can exploit that a 3D swizzling can often be factorized into 3 schemes that are 1D which greatly simplifies the overhead. This fact is exploited by factorizing the 2D swizzling here into 2 swizzling schemes that are 1D.

Example

Say the 3-ary number that describes a block zwizzling pattern is given as
012012012
Then to arrive at the binary tile swizzling pattern one has to remove the digits 2 from the 3-ary number and arrives at the binary number
010101
which describes the according tile swizzling pattern one is searching.

FIG. 1 demonstrates that accesses in y-direction of the tile are not handicapped compared to accesses in x-direction when tile swizzling is used. The right image shows an initial MIP image, where the viewing orientation is orthogonal to the x-y plane of the volume slices and the x-direction of the image plane is parallel to the x-direction of the volume dataset. When doing an inplane rotation of this initial MIP image, every 90 degrees the x-direction of the volume dataset is either parallel to the x-axis or the y-axis of our image. The left image shows the rendering time 6 of such an inplane rotation in polar coordinates, where our dynamic approach using tile swizzling is used as volume rendering algorithm on a single CPU quad-core Nehalem machine. As we can see the fastest rendering time is achieved at points 8 every 90 degrees, demonstrating that tile data accesses in y-direction are not handicapped compared to accesses in x direction.

Advantage of tile swizzling for SIMD read/write operations:

When using the set $P_{Front\_Sub}(B,R)$ the volume rendering image result data can be calculated in parallel for $2^R$ values using SIMD. However, the result can not be stored linearly but has to be scattered, unless we are in the special case where the last R digits of the 3-ary number do just contain the digit 0.

Storing tile data in swizzled form as just presented, not just minimizes cache thrashing but moreover that also solves this scatter problem. In this case, for $P_{Front\_Sub}(B,R)$ the volume rendering result data can not only be calculated in parallel, but the result can additionally be stored in a linear sequence.

Using tile swizzling for sampling patterns that are within the set $P_{Front\_Sub}(B,R)$, one arrives at the following important property of the method according to the invention: For all elements in $P_{Front\_Sub}(B,R)$ sampling of volume data as well as processing of the sampling data can occur fully in parallel using SIMD and additionally the result can be stored linearly into the tile without having to scatter the data. This means that SIMD can be fully exploited for each index subset J(i) of size $2^R$ and additionally the result data of those $2^R$ elements can be stored linearly into the tile data (see FIG. 14).

Implementation details for using the algorithm for volume rendering:

In the following, the complete dynamic algorithm in short when used for volume rendering is described.

Steps that can be done upfront:

define the block size of B that should be used. This block has the size $(2^X, 2^Y, 2^Z)$.

the tile size is then defined to be $(2^X, 2^Y)$.

define if the sampling pattern should lie within the whole set $P_{Front\_Sub}(B)$ or if this set should be reduced to a subset. Because of its SIMD advantages an excellent candidate for such a subset is $P_{Front\_Sub}(B,R)$. Since on future hardware the SIMD register width R will continue to increase, it will be likely to reach a point where the full set $P_{Front\_Sub}(B,R)$ no longer is the best choice. In such cases, it is advantageous to use subsets of $P_{Front\_Sub}(B,R)$ instead where the occurrence of the digit 2 in the last R digits is minimized, since this minimizes the part where calculations that use the sampling results have to do some parts in a sequential order.

Steps that have to be done whenever the viewing orientation changes:

calculate the 3-ary number that describes the mapping

Using the 3-ary number, calculate the mapping from I to the local x-y-z block indices of all sample points of Block B. Possible strategies are For each sampling position within the block store the according local x, y and z indices within the block. This allows to calculate everything that is required later during sampling. (on the fly mode)

For each sampling position within the block, store the local 3 dimensional sampling positions represented by 3 float values and the relative positions in the tile image as (short) integers. (pre-calculate mode)

when calculating the index mapping from I to the local x-y-z block indices, exploit the SIMD handling of the indices. As described, this mapping only has to be done for $2^{X+Y+Z-R}$ indices instead of having to do this for all $2^{X+Y+Z}$ indices, which helps reducing the index mapping overhead.

calculate the binary number that describes the tile swizzling scheme. The tile swizzling is defined by removing all digits 2 from the 3-ary number.

using the binary number, create the index mapping arrays from the regular tile image data to its swizzled form and from swizzled form into regular form. This can be done efficiently by exploiting SIMD and by factorizing the 2D swizzling into 2 schemes that are 1D.

For each tile for each ray within the tile, calculate the start and end indices that define the region that lies within the volume V clip away those parts that are described by geometric objects as clip-planes and crop-boxes. This step updates the start and end indices for each ray.

in case of VRT rendering, clip also away those parts where the alpha value is zero since they do not contribute to the result image. This step updates the start and end indices for each ray.

determine those blocks B(k) within the tile that contain indices described by the start and end indices of the rays within the tile to speed up the empty space skipping, calculate the values StartPartial, EndPartial, StartFull and EndFull for the sub-tiles T(B(J(i))) for the required subdivision hierarchy levels for a hierarchic testing.

for each block B(k), sample all positions in an order as described by the 3-ary number. Skip those samples that are not described by the start and end indices for each ray. For en efficient skipping, use hierarchic trivial accept and trivial reject testing.

use the calculated samples as required for volume rendering. In the case of using $P_{Front\_Sub}(B,R)$ we can de the sampling as well as the remaining volume rendering calculations in a SIMD manner (if LUT fetches occur during rendering, this requires a gather operation).

when updating the tile image data, store the result in a swizzled form. In the case of using $P_{Front\_Sub}(B,R)$ this can be done very efficiently since the $2^R$ values can always be stored in a linear way without having to use a general scatter mechanism.

when the rendering is completed, copy the swizzled tile data into the final result image. Here the swizzled image data is brought into its unswizzled form again.

Since the handling for one tile is independent of the other tiles, the tile computations can directly be done multi-threaded.

In case that we are using the static sampling approach some additional parts can be done upfront:

the 3-ary number can be determined upfront for each sampling position of the block B the x, y and z indices can be determined upfront (on the fly mode)

for each sampling position of the block B the relative position in the tile image can be determined upfront (pre-calculate mode)

the binary tile swizzling number can be determined upfront the creation of the index mapping arrays from the regular tile image data to its swizzled form and from swizzled form into regular form can be determined upfront.

In case we are not doing volume rendering some parts are not necessary:

It is not necessary to swizzle the tile image.

In summary, a novel method for sampling of volume data on a regular grid was presented. The algorithm used does not modify the storage format of the volume, but instead modifies the order in which the sampling positions are traversed during volume sampling. In existing approaches the sampling patterns were only modified with very simple strategies, e.g. packeting of rays, usually in combination with strategies that do also modify the volume storage format. In the approach according to the invention a completely novel sampling strategy that allows achieving excellent performance even without modifying the volume storage format was developed.

Interpreting volume sampling of a regular grid as a general mathematical problem that requires the study of the set $P_{Front}$ which is a subset of the set of permutations of the sampling positions of a block B is proposed by the invention.

Since optimizing within the complete set $P_{Front}$ would be very time consuming, a subset $P_{Front\_Sub}(B)$ was developed that is much simpler to handle but is still very large. This subset has the especially important property that each member of this set can be described uniquely using a 3-ary number, which allows a very simple description of the elements.

It has been shown how to minimize the effort for precalculating the index mapping by keeping the block B small and instead rasterize the set of sample positions S with blocks that have the same size as B but different start positions.

An algorithm that allows constructing dynamically an element of $P_{Front\_Sub}(B)$ was developed that has an excellent memory cache reuse. Because of its dynamic nature, this algorithm is able to take all dynamic parameters into account that influence the rendering performance, like viewing orientation and zoom factor in addition to more static parameters like image size and the voxel size of the dataset.

The concept of an average cache measure was developed that allows constructing the 3-ary number describing the access pattern. For the especially important case where the volume is stored as an array of slices, or an array or pointers to slices an analytic average cache measure was developed that allows to calculate the measure very efficiently.

By restricting the set $P_{Front\_Sub}(B)$ to the subset $P_{Front\_Sub}(B,R)$ that does not contain 3-ary numbers where the digit 2 occurs in the last R digits, it was shown how to achieve that not just the sampling can be done in a data parallel way using SIMD, but also the calculations that are done within the algorithm into which the sampling is embedded. In case of large R where the digit 2 can not be avoided completely, it has been shown how to minimize the sequential calculation parts by minimizing the occurrence of the 2 digit in the last R digits.

It has been shown that there exist restrictions of the set $P_{Front\_Sub}(B)$ that would allow calculating the local block positions on the fly without having to pre-calculate the index mapping.

It has been shown how to efficiently test if sub-blocks are completely inside or outside of the set of samples S using hierarchical trivial reject and trivial accept tests. This allows skipping the sampling positions that do not have to be sampled very efficiently.

A static sampling algorithm was developed that does not require information about the volume data format. This allows using the presented ideas also in case for volume datasets that are not stored as a linear slice array.

Furthermore, an algorithm for storing the image part of a tile in a swizzled way was developed so that during sampling the accesses to the image in y direction are not handicapped compared to accesses in x-direction. The tile swizzling scheme arises by projecting the sampling position swizzling of a Block B onto the tile image plane. In the dynamic sampling position swizzling case this means that also the image position swizzling becomes dynamic and adapts to the properties of the 3-ary number.

When using sampling patterns that lie within the set $P_{Front\_Sub}(B,R)$ where the last R digits do not contain the digit 2, this tile swizzling allows linear read and write access to the tile data without having to do a scatter operation. The set $P_{Front\_Sub}(B,R)$ in combination with tile swizzling therefore allows to do the sampling and the processing of the samples completely in SIMD and additionally allows to store the result without requiring a scatter operation. These properties make this combination especially interesting.

Our algorithm we propose has many major advantages compared to existing approaches.

General advantages of both dynamic and static approaches:

The method according to an embodiment of the invention allows achieving an excellent performance also in the case where the volume data is stored linear in RAM, so that a slice array is formed. This allows building a medical imaging platform with just one single data format based on a linear slice array. There is no need to convert the volume data into other formats because of performance reasons, which allows keeping memory storage requirements for volumes minimal.

A linear slice array is a very simple data structure that arises naturally:

The indices to access a voxel can easily be calculated, there is no need to access multiple array tables to determine each voxel index.

Storing the volume data in a slice array is the natural format in medical software applications, since slices reflect the DICOM structure of the volume dataset. Therefore, in professional medical software visualization platforms, datasets are often stored linearly in memory and shared across processes.

Since the linear slice array format is the most common format that is supported by most software packages, it greatly simplifies the integration of external software.

In some algorithms volume data is generated artificially via some kind of render to 3D-texture approach, where the volume is generated as a slice array. Such algorithms do not have to convert the slice output but can store the result directly into the volume data structure.

The method can be implemented very efficiently; the theoretical advantage of an improved memory access pattern can nearly fully arrive in an application.

In most cases the method according to an embodiment of the invention achieves at least similar or even better performance than approaches that use swizzled volumes. On latest CPU hardware with fast cache and fast memory accesses in combination with Hyperthreading, it has significant advantages. This was demonstrated in our test examples by comparing the performance on an Intel Harpertown CPU system with the performance on an Intel Nehalem CPU system (see FIGS. 30 through 40). Since the cache access performance as well as the memory bandwidth will continue to increase in the future, this approach is of especial interest for next generation hardware. With its manifold properties, the approach should be of especial interest for the upcoming Larrabee many-core CPU from Intel.

For each single sample the method basically requires to determine the sampling position and the position in the result image, this is independent of the type of sampling that is performed. For swizzled volume data each voxel address has to be transformed into the swizzled format, the more voxels that are involved in a sampling step the more overhead is generated. In our case the overhead is independent of the number of voxels that have to be touched in the sampling step.

On some processors there exists special hardware for sampling (3D texture sampling), that is e.g. able to calculate a trilinear volume sample. When using such a hardware the neighbor voxels are loaded automatically by the hardware, without an influence to apply the swizzling function for each voxel address. Since our approach does the swizzling part just on the sampling position instead of the voxel data, our approach allows to exploit special processor hardware for volume sampling. The only requirement is that the processor can be programmed flexibly enough to perform the method according to the invention. The upcoming Larrabee processor from Intel which can be seen as a GPU that allows the programmable freedom known from CPUs should fall into this category.

Specific Advantages of the Dynamic Case:

A modification of the volume data format is an operation that is static in nature. It has to be done once in a pre-processing step since it would be too expensive to do it on the fly during sampling. But due to this static nature this volume conversion step can not take any properties of the sampling grid into account that are not known in advance. This is not the case with the method according to the invention, since the algorithm allows to do the optimization dynamically during sampling, where all grid properties are known. This dynamic sampling does not just guarantee a good average performance but allows additionally exploiting special constellations. By modifying the format in which the volume dataset is stored, it is possible to achieve a good performance. However, compared to a linear slice array format for various grid angles the performance is decreased, especially for some especially important angles where parts of the grid are parallel to the volume axes. The invention allows to combine the best of both; a fast performance for general grid axes while keeping the advantages of a slice array for some especial grid angles (see FIGS. 18 through 29).

Specific Advantages of the Static Case:

Embodiments of the invention can also be used for general volume data formats using a static sampling point access pattern. In this static form it is a general memory access optimization algorithm for general volume data formats.

On processors where there is a special volume sampling hardware available, it might be possible that the internal volume data format is not known. Since in the static case the method can be applied also on volume data where the internal volume format is not known, this allows to use the algorithm also in such cases.

In some cases it is desirable to minimize the viewing direction dependency during volume rendering. By combining the static approach with a swizzled volume data format, it is possible to achieve exceptional viewing direction independency since the smoothing effects of both approaches are accumulated (see FIG. 34).

While for volumes stored in a linear form the dynamic approach produced the best results, the static approach was even in this case able to prevent major cache thrashing, which is not true for existing ray packeting approaches. So even in such an extreme situations the static approach was able to demonstrate its cache thrashing preventing properties, making it an excellent substitute in cases where the dynamic scheme can not be used (see FIGS. 33 and 38).

Figure 2:
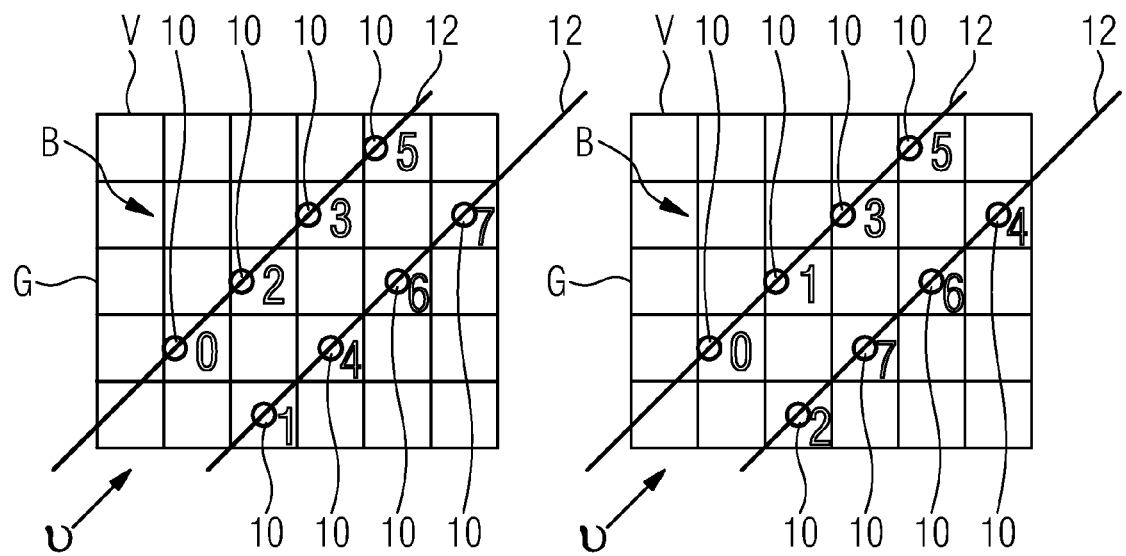
FIG. 2 illustrates two depictions of a block B consisting of eight sampling positions in the two-dimensional case.

FIG. 2 shows two depictions of a block B consisting of eight sampling positions 10 in the two-dimensional case, the three dimensional case works analogously. The block B has the size $(2^X, 2^Y)$, with X=1,Y=2 and lies within the two-dimensional volume V, where the volume V is here demonstrated as a grid G. The block B consists of two rays 12 along a vector v, on each ray 12 there are four sampling positions.

The sampling position indices in FIG. 1 describe in which order the sampling is done.

On the left side one can see that the left ray 12 consists of the sampling position indices 0, 2, 3 and 5, while the right ray 12 consists of the indices 1, 4, 6 and 7. Since for both rays 12 the indices are increasing monotonously, the block B is in this case within the set $P_{Front}(B)$. On the right side one can see an example of a block B that does not lie within $P_{Front}(B)$, here the ray 12 that consists of the indices 2, 7, 6 and 4 has indices that are not increasing monotonously.

The set $P_{Front\_Sub}(B)$ is a subset of $P_{Front}(B)$, where each access pattern can be described by a 3-ary number in the three-dimensional case. In the two-dimensional case each pattern can be described by a binary number. FIG. 3 shows in the two-dimensional case an example that lies within $P_{Front\_Sub}(B)$ and also an example that does not lie within that set.

Figure 3:
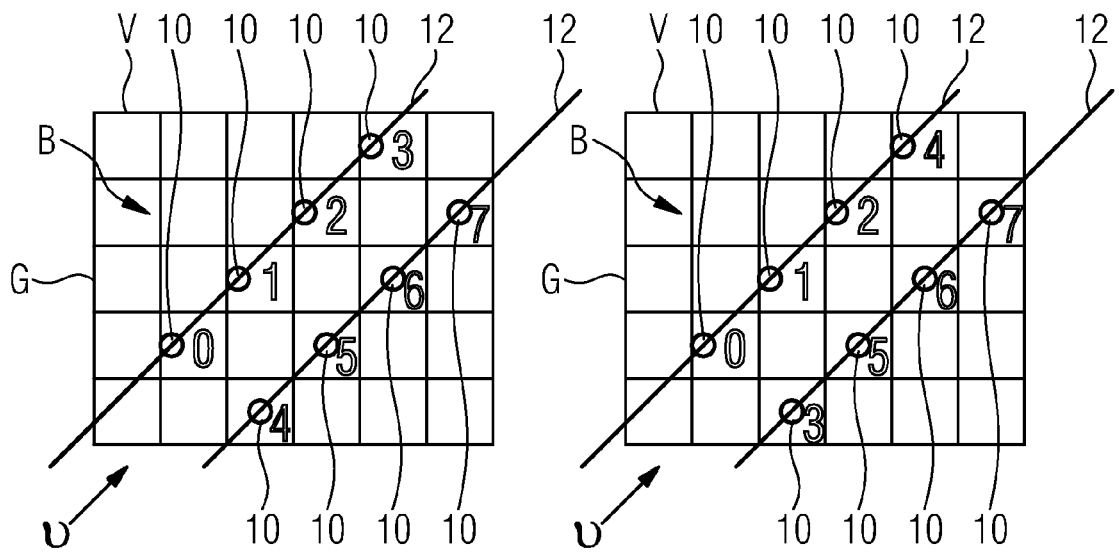
FIG. 3 illustrates in the two-dimensional case a sampling access pattern that lies within $P_{Front\_Sub}(B)$ and also one that does not lie within that set.
Figure 4:
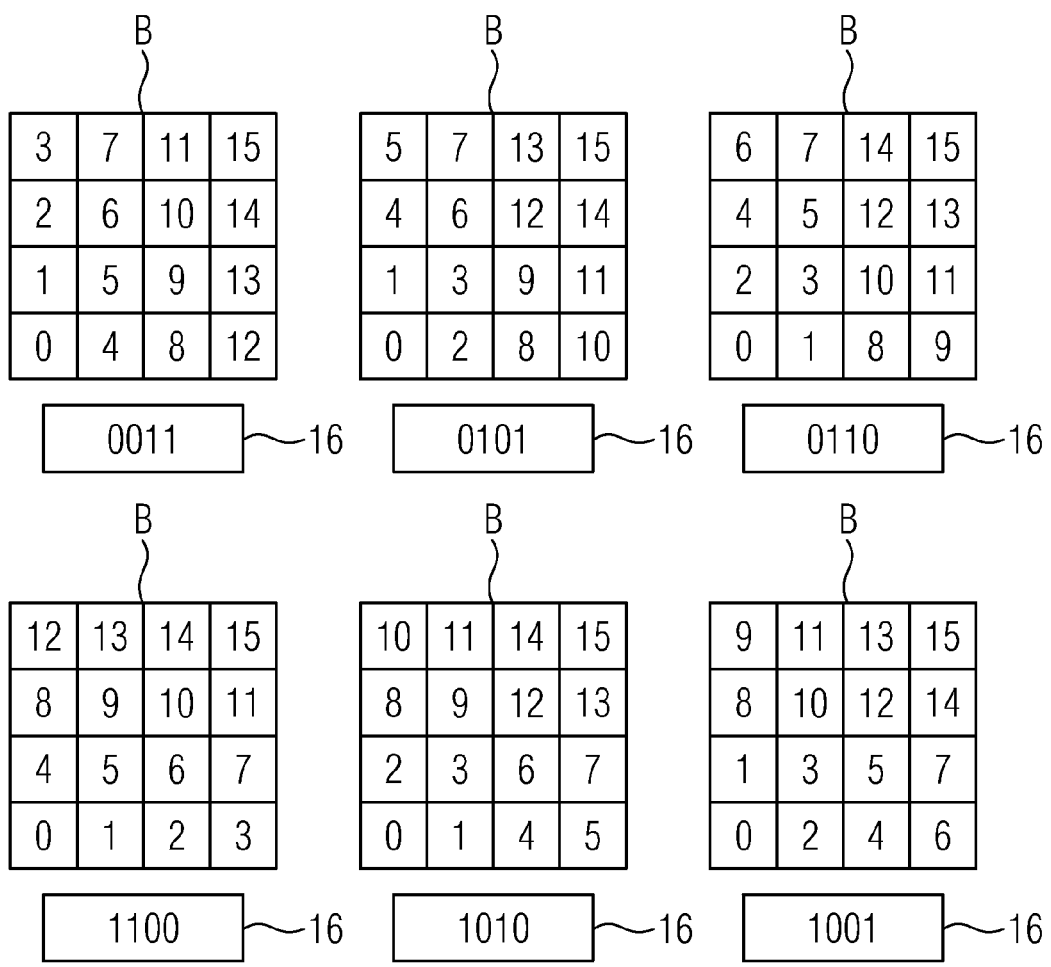
FIG. 4 illustrates the six memory access patterns for sixteen sampling positions together with the according binary numbers.

The left side of FIG. 3 shows an example that lies within $P_{Front\_Sub}(B)$, the sampling pattern can be expressed by the binary number 011. The two sub-blocks of hierarchy level 1 for the left side consist of the index sets $\{0, 1, 2, 3\}$ and $\{4, 5, 6, 7\}$. The 4 sub-blocks of hierarchy level 2 consist of the index sets $\{0, 1\}$, $\{2, 3\}$, $\{4, 5\}$ and $\{6, 7\}$. As can be seen here all sub-blocks of the same hierarchy level have the same local indices, when interpreted modulo the sub-block size. The sub-blocks of hierarchy level 1 consist modulo 4 by the sequence 0, 1, 2, 3 while the sub-blocks of hierarchy level 2 here consist of the modulo 2 sequence 0, 1.

The right side of FIG. 3 shows an example that lies within the set $P_{Front}(B)$ but that does lie within $P_{Front\_Sub}(B)$. There is no binary number, i.e. no recursive subdivision that can describe this sampling pattern. There are only two possible level 1 hierarchy splits, in the 0 case the sub-blocks would consist of the index sets $\{0, 1, 2, 4\}$ and $\{3, 5, 6, 7\}$ and the 1 case would consist of the two index sets $\{0, 1, 3, 5\}$ and $\{2, 4, 6, 7\}$.

If this pattern would be within $P_{Front\_Sub}(B)$ then the following properties would have to be satisfied:

modulo 4 the hierarchy level 1 would consist of the local index set $\{0, 1, 2, 3\}$ and modulo 4 all hierarchy level 1 would have to have the same local index pattern Since these conditions are not satisfied, the sequence on the right side can not be within $P_{Front\_Sub}(B)$.

Now, one can take a look on a sampling position block B of size 4×4×1, which also can be interpreted as a 2 dimensional block B. Since it is not possible to halve the block in z-direction, the set $P_{Front\_Sub}(B)$ contains only binary digits. The set $P_{Front\_Sub}(B)$ can be described by all binary numbers with 4 binary digits that contain 2 zero and 2 one binary digits. The six memory access patterns for these sixteen sampling positions together with the according binary numbers 16 are visualized in FIG. 4.

In all cases the two blocks of hierarchy level 1 have the indices 0-7 and 8-15 the 4 blocks of hierarchy level 2 have the indices 0-3, 4-7, 8-11 and 12-15 the 8 blocks of hierarchy level 3 have the indices 0-1, 2-3, 4-5, 6-7, 8-9, 10-11, 12-13 and 14-15 the 16 blocks of hierarchy level 4 are the 16 single sample positions.

For a given n-ary number, all sub-blocks of any hierarchy level have equal indices when calculating them modulo the size of the sub-block and additionally these local indices occur in with the same local pattern.

Figure 5:
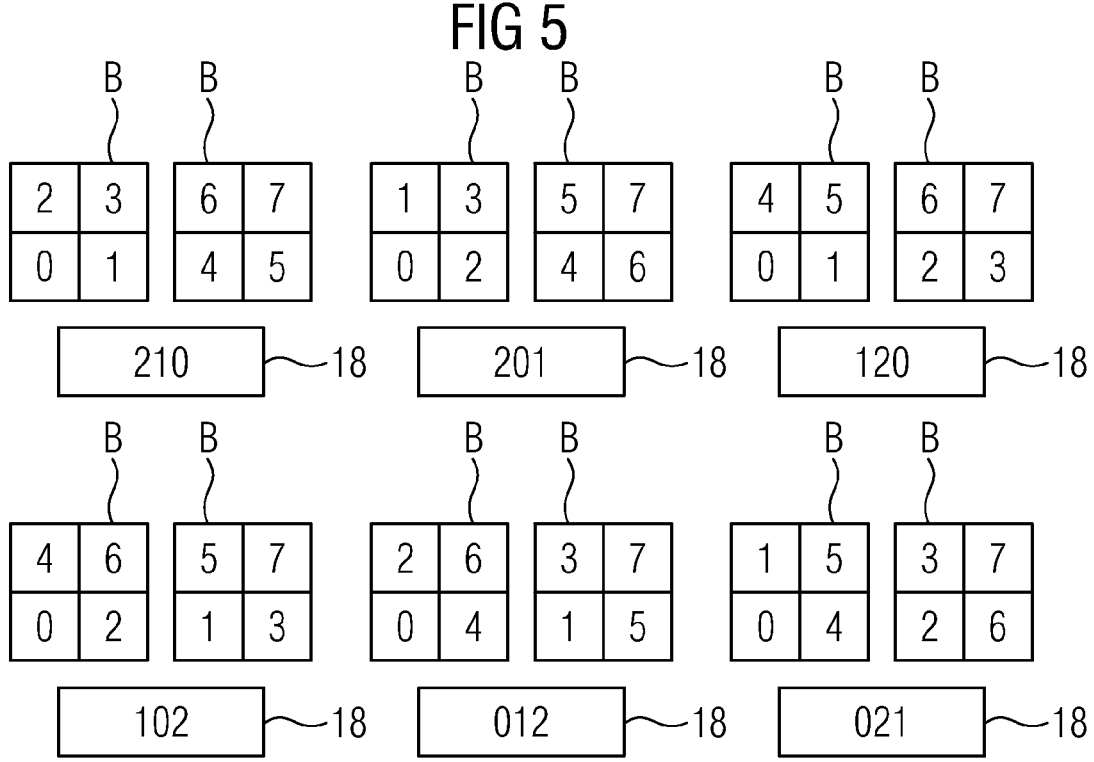
FIG. 5 illustrates a block B having the size 2×2×2, here visualized as two 2-dimensional blocks of size 2×2×1=2×2.

FIG. 5, the block B has the size 2×2×2, here visualized as two 2-dimensional blocks of size 2×2×1=2×2. The set $P_{Front\_Sub}(B)$ can be described by all 3-ary numbers that contain one 0, one 1 and one 2 digit. The six memory access patterns for these 8 sampling positions are visualized in FIG. 4, together with the according 3-ary number 18.

FIG. 5 shows why the restriction of the set $P_{Front\_Sub}(B)$ to the subset $P_{Front\_Sub}(B,R)$ is of especial interest: Assume one has formulated the block B to be of size 2×2×2 and the hardware allows to do two operations in parallel (R=1). The 3-ary numbers with the resulting indices have already been shown in FIG. 5. There are four index blocks (0, 1), (2, 3), (4, 5) and (6, 7), the indices within the same index block can be handled in parallel since R=1.

In case of volume rendering the sampling results of rays along the z-direction are used in a sequential manner. Because of this, the 3-ary numbers 102 and 012 would require using the sampling results sequentially, since those 4 index blocks lie within the same ray along the z-direction. The set $P_{Front\_Sub}(B,1)$ in this example consists of the 3-ary numbers 210, 201, 120 and 021, each of those n-ary numbers would allow to do the volume rendering blending operations fully in parallel since the pairs do not lie within the same ray.

FIG. 6 demonstrates the analytical average cache measure $f(B)$ for the two-dimensional case. When accessing a voxel in a dataset, usually not just one voxel is cached, but a whole cache line. In the case that the dataset is stored in a linear fashion, this means that a voxel access along one direction is much more likely to get a cache hit than other directions. In FIG. 6, B is a block of size $(2^X, 2^Y)$, with X=1,Y=2 and E is defined as the parallelogram defined by the 2 vectors $(2^X-1)v_x$ and $(2^Y-1)v_y$; the picture shows the objects in voxel space, the cache lines are oriented along the x-axis. Here, the function $f(B)$ can be determined by projecting E onto the y-axis in voxel space and by applying the area metric there. In the 2 dimensional case the area metric becomes the length metric along the y-axis. To take the support of the sampling operation into account, E is enlarged to an object E' assuming a spheric support of the sampling operator with radius $c_S$.

In the three-dimensional case things are handled exactly the same, with the difference that here E is a parallelepiped by three vectors and the projection is done onto the y-z plane.

FIGS. 7 and 8 demonstrate how block subdivisions are related to the sampling indices. Here, B is a block of size $(2^X, 2^Y)$, with X=1,Y=2. Lets assume the solution can be described by the binary number 101.

The first binary digit (the leftmost digit) is 1; therefore one has to subdivide first along the y-direction, shown by line 20 in FIG. 7. The second subdivision is done in x direction, shown by line 22 in FIG. 8, and the last one is again done in y-direction shown by lines 24, leading to the indices as shown in FIG. 8 under the convention that sampling access always starts in the left and bottom sub-blocks.

Figure 9:
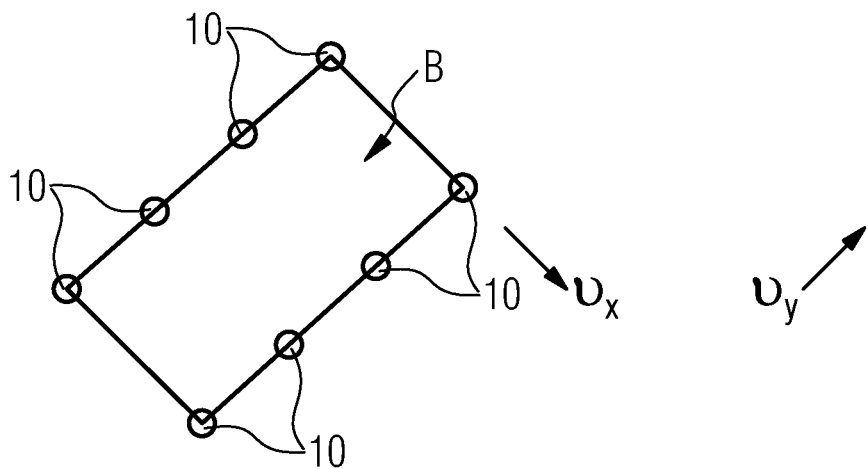
FIGS. 9, 10, 11, 12 illustrate the subdivision step in the dynamic case using a 2D example.
Figure 10:
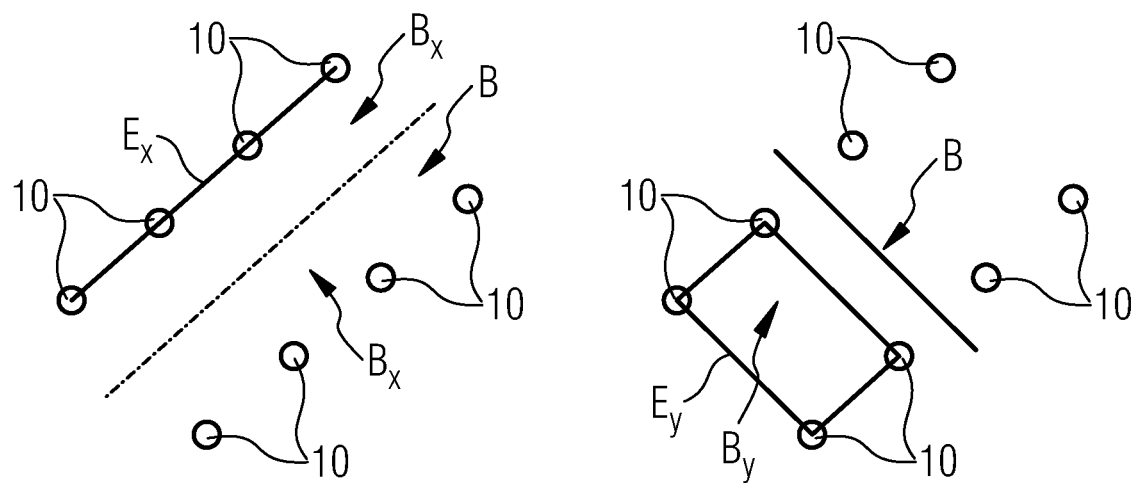
Figure 11:
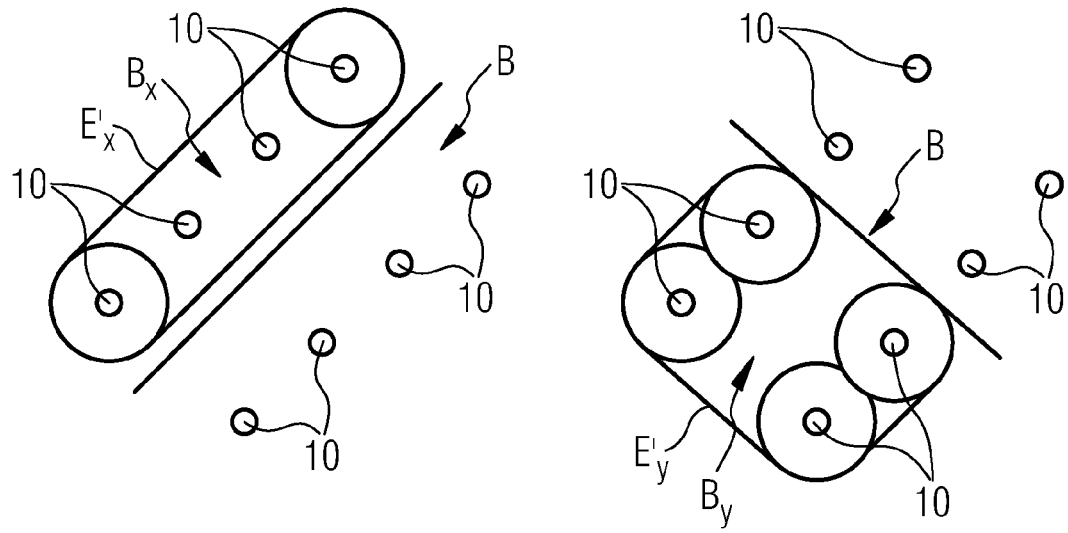

FIGS. 9, 10 and 11 demonstrate how the subdivision step in the dynamic case works using a 2D example. Let B be a block of sampling positions 10 of size $(2^X, 2^Y)$, with X=1,Y=2, shown in FIG. 9. There are 2 subdivision steps for the block B possible, one in x-direction, the other in y-direction.

FIG. 10 shows the subdivision in x-direction creating sub-blocks Bx on the left side and the subdivision in y-direction creating sub-blocks By on the right side. Let $E_x$ be the convex hull of the sampling positions in Bx and let $E_y$ be the convex hull of the sampling positions in By.

These objects $E_x$ and $E_y$ are now enlarged assuming that sampling steps have a spherical range of influence, leading to objects $E'_x$ and $E'_y$, shown in FIG. 11. These objects are now used to calculate the average cache measure function that determines the number of cache lines that these objects will touch assuming an average position in the coordinate system. If $E'_x$ leads to a smaller number than $E'_y$, a subdivision in x direction has to be done (binary number 0), otherwise a subdivision in y direction has to be done (binary number 1).

Figure 12:
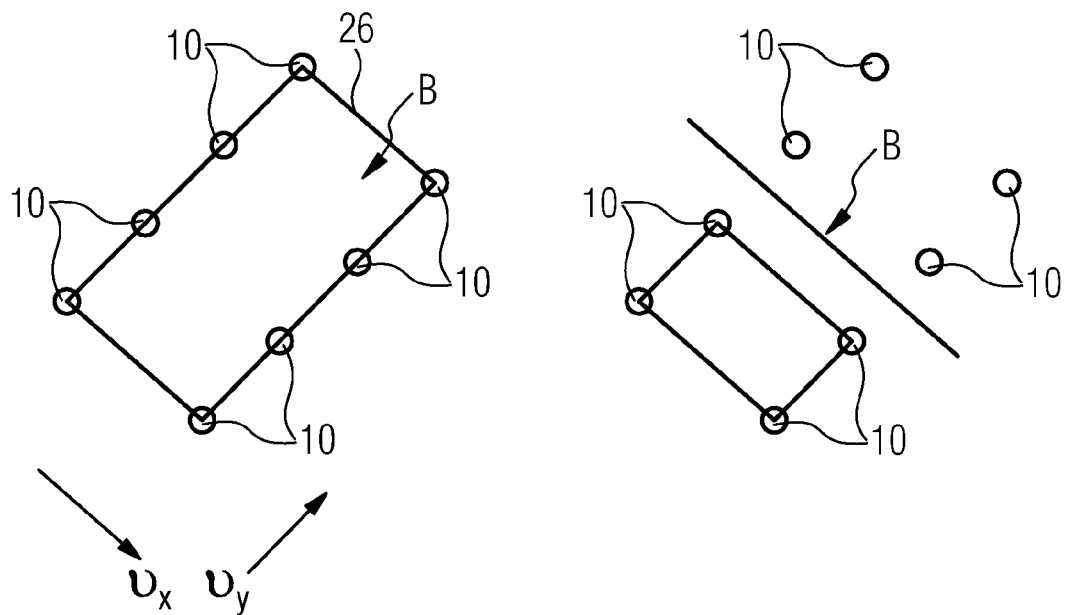

FIG. 12 demonstrates how the subdivision step in the static case works using a 2D example. Let B be a block of size $(2^X, 2^Y)$, with X=1,Y=2, shown on the left side of FIG. 12. The convex hull of the sampling positions of B form a parallelogram 26 with the edges $(2^x-1)v_x=v_x$ and $(2^Y-1)v_y=3v_y$.

Since in this example the length of $3v_y$ is larger than the length of $v_x$, this means that in this case the subdivision has to occur in y-direction, shown on the right side of FIG. 12. This leads to sub-blocks that are closer to a cube than the sub-blocks of a x-direction subdivision would have been.

FIG. 13 demonstrates the block rasterization in 2D. The set of sampling positions S where the volume has to be sampled is covered by blocks B(k) so that each block contains at least one sample. In this example B is a block of size $(2^X, 2^Y)$, with X=2,Y=1. There are 3 blocks B(k) that cover all samples. When sampling the set S for creation of a picture tile T, all blocks B(k) are sampled sequentially with increasing k. Within a block B(k) the positions where no actual sampling is done are skipped.

Figure 14:
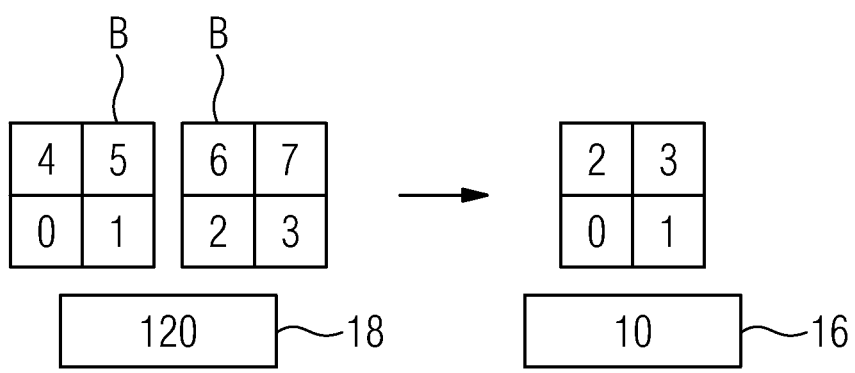
FIG. 14 illustrates the binary representation of the tile swizzling derived from the 3-ary number of the blocks by removing the digit 2 from the 3-ary number.

When doing volume rendering, to minimize the cache misses not just when accessing the volume data, but also when accessing the image data, a 2D tile swizzling scheme is proposed according to one aspect of an embodiment of the invention. The binary representation of the tile swizzling is derived from the 3-ary number of the blocks by removing the digit 2 from the 3-ary number. FIG. 14 shows a simple example for the 3-ary number 120:

Assuming R=1, the last R digits here do not contain the digit 0, so this case lies within $P_{Front\_Sub}(B,1)$. This means we can do sampling and processing of the sampling data of $2^R$ indices in parallel and additionally those $2^R$ results can be stored linearly without having to do a scatter operation. In this case this means that all index pairs (0, 1), (2, 3), (4, 5) and (6, 7) can be sampled and processed fully with SIMD of size R=1 and the result can always be stored linearly into the swizzled tile data. In this case the results for sampling indices (0, 1) and (2, 3) can be stored linearly into the tile data of tile indices (0, 1) and the results for the sampling indices (4, 5) and (6, 7) can be stored linearly into the tile data of tile indices (2, 3).

FIG. 15 demonstrates how to efficiently skip blocks of sampling positions. Again, this is done in the 2D case instead of 3D, but it works completely analogous in 3D. In this example we see a tile T and the 4 rays 12 that pass this tile T. The ray samples that are within the volume V can be described by start and end indices along the $v_y$ vector. The first, upper ray 12 has the start and end indices 2 and 3. The second ray 12 has the start and end indices 0 and 4, the next one 1 and 4 and the last ray 12 has the indices 2 and 3. These start and end indices for each ray 12 describe the region of sampling positions where sampling actually has to be done. For the tile T one can create the 4 values StartFull=Max of all start values within the tile T
StartPartial=Min of all start values within the tile T
EndPartial=Max of all end values within the tile T
EndFull=Min of all end values within the tile T In this example we can see that the ray index region where all rays 12 contribute is between index 2 and 3 (trivial accept). The index regions 0 to 2 and 3 to 4 describe index regions where samples occur partially, in all other cases nothing has to be sampled (trivial reject). By using such optimization data one can handle the empty space skipping efficiently, since it allows to skip complete sub-blocks that satisfy a trivial accept or trivial reject case.

Figure 16:
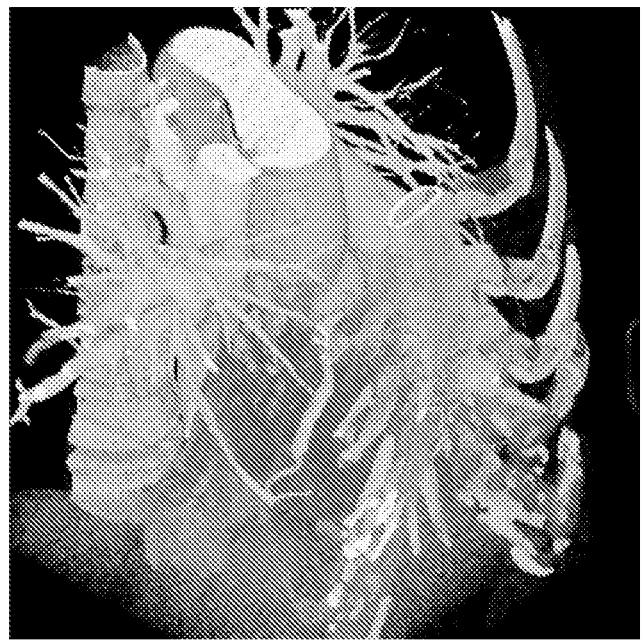
FIGS. 16 and 17 illustrate two kinds of volume rendering that were implemented to do the sampling part using the method according to an embodiment of the invention.
Figure 17:
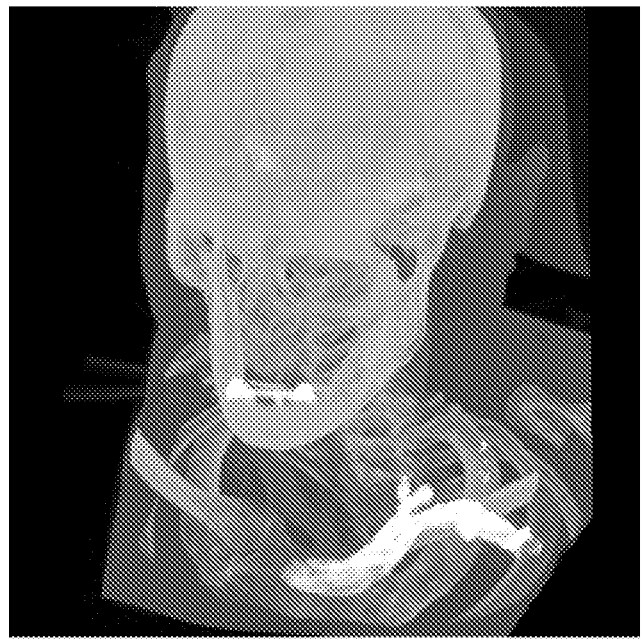

FIGS. 16 and 17 show two kinds of volume rendering that were implemented to do the sampling part using the method according to an embodiment of the invention. In the examples the sampling that was done used a trilinear interpolation and was implemented using SSE 4.1. Since SSE allows to handle four float values in parallel this means that in this case one has R=2.

In these examples blocks B that were of size $(2^X, 2^Y, 2^Z)$, with X=5,Y=5,Z=5 have been used. The tile size was $(2^X, 2^Y)$, the 3-ary numbers therefore have 15 digits. These settings were also used in the following volume rendering examples. In the dynamic case a cache measure function with $c_S \approx 0.86$ was used.

The sampling positions were not just swizzled but also the local tile data by projecting the 3-ary number to a binary number, where the binary number has 10 digits. The set $P_{Front\_Sub}(B)$ was restricted to the subset where the 2 rightmost digits were 10. Since R=2 and the digit 2 do not occur in the last 2 digits by definition, all occurring 3-ary numbers lie within the set $P_{Front\_Sub}(B,2)$ which allowed not just to do the sampling with 4 values in parallel per thread, but also to do the remaining volume rendering calculations in parallel and to store the result linearly into the swizzled tile image.

The CPU tests were done mainly on the Intel Nehalem architecture, which has brought major changes compared to its predecessor Harpertown. Especially the considerably improved cache and memory accesses and the dual threaded SMT (Hyperthreading) are features where the method according to the invention strongly benefits from.

FIGS. 18 through 22 show results comparing the method according to the invention with other approaches on an Intel Nehalem system for viewing orientations that are not parallel to one of the major volume dataset axes. A trilinearly interpolated MIP image was calculated on a system with two Quadcore Nehalem CPUs, leading to eight physical cores and 16 virtual cores because of SMT. The Nehalem architecture had a triple channel DDR3 memory interface.

In all cases the tile size was 32×32 and the tiles were calculated using 16 threads in parallel. All algorithms were implemented by using SSE SIMD, which allows handling four float operations in parallel. In all cases the same set of sampling positions S was used. Important in this example are not the absolute numbers, but rather the distribution within one graph and the relative comparison between the approaches.

FIGS. 18 through 22 show the resulting rendering performance when doing an inplane rotation for the selected initial viewing orientation using polar coordinates.

The first number Mi shows the fastest rendering time that occurred during the inplane rotation. The inner circle 30 indicates this smallest rendering time and the line 32 from the origin to this circle 30 indicates for which inplane orientation angle the smallest value occurred. The second number Av indicates the average performance across all measured inplane orientations. The last number Ma indicates the performance for the worst case orientation that was measured during the inplane rotation.

Figure 18:
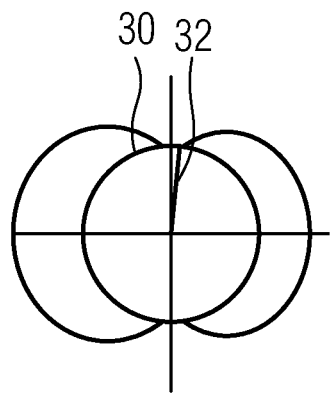
FIGS. 18 through 23 illustrate results comparing the method according to an embodiment of the invention with other approaches on an Intel Nehalem system for viewing orientations that are not parallel to one of the major volume dataset axes.
Figure 19:
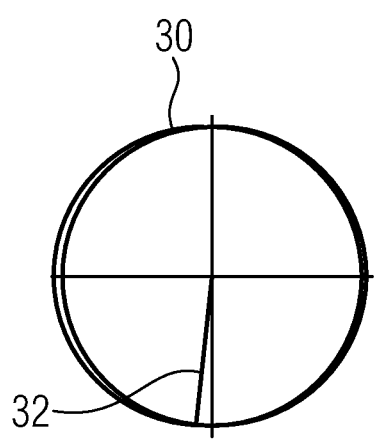
Figure 20:
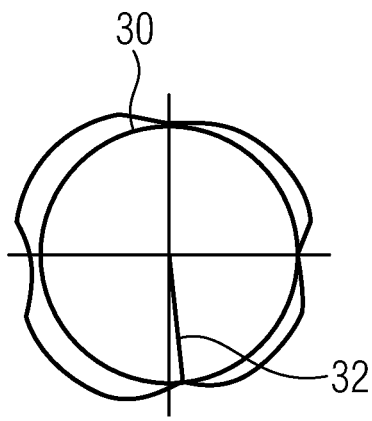
Figure 21:
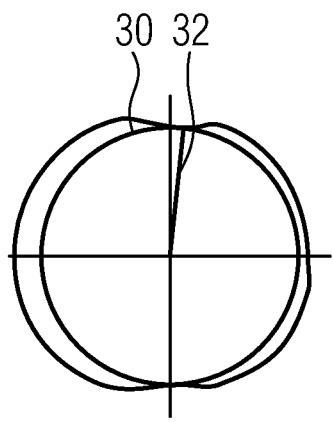
Figure 22:
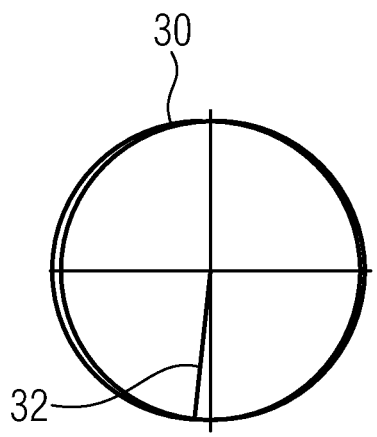

FIG. 18 shows the results of the inplane rotation for the case where four rays were combined into a ray packet, the volume was stored as a linear slice array. FIG. 19 shows the result for the case where four ray packets were used, but the volume was stored in a swizzled volume format using cubic swizzling. FIG. 20 shows the results for our dynamic sampling approach using a linear slice array volume. FIG. 21 shows the result for the static sampling approach for the predefined 3-ary number 210210210210210 using a linear slice array volume. Finally FIG. 22 shows the result for the case where the volume was stored in the cubic swizzling format and where additionally the static sampling approach was used for sampling. FIG. 22 shows the initial viewing orientation of the object sampled.

FIG. 18 demonstrates the large performance impact that cache thrashing has. In this case the performance numbers are much worse than for the other algorithms. On older systems with a slower memory accesses these numbers would even be much worse.

As one can see, the dynamic and static approaches according to an embodiment of the invention are considerable faster than the other approaches, where the dynamic approach has here only a slightly better average performance than the static approach. FIG. 21 shows that by combining the swizzled volume storage format with the static sampling approach one achieves an exceptionally smooth orientation independence, since the difference between the fastest and the slowest case are very small. The cases using a swizzled volume dataset in FIGS. 19 and 22 are slower than the dynamic and the static approach in FIGS. 20 and 21, but one can see that here the resulting graphs are smoother.

FIGS. 24 through 29 show the same test case as FIGS. 18 through 23, with the same Nehalem system, but with the difference that here the viewing orientation (see FIG. 29) was chosen so that it was parallel to the x-direction of the volume dataset. This is the fastest direction for the ray packet case, since the rays here practically always find the required voxels in a cache.

Figure 23:
Figure 24:
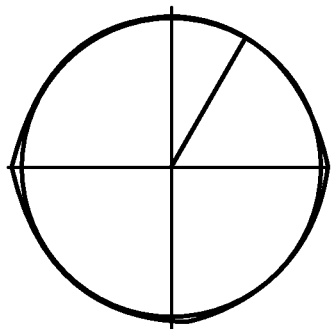
FIGS. 24 through 29 illustrate the same test case as FIGS. 18 through 23, with the same Nehalem system, but with the difference that here the viewing orientation (see FIG. 29) was chosen so that it was parallel to the x-direction of the volume dataset.
Figure 25:
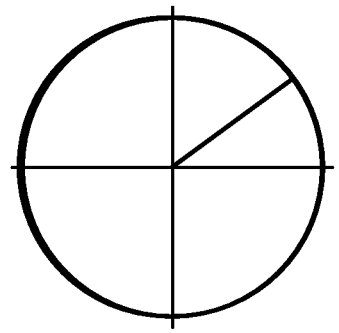
Figure 26:
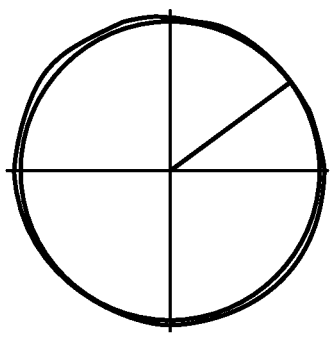
Figure 27:
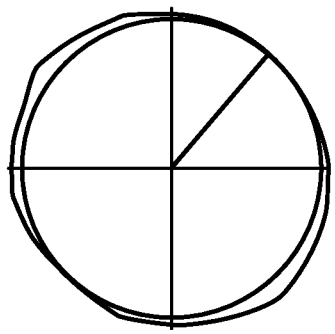
Figure 28:
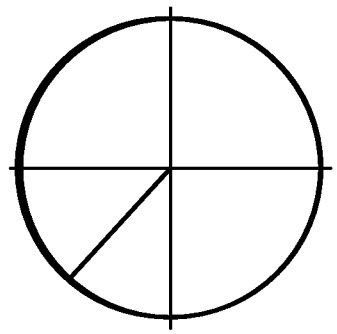
Figure 29:
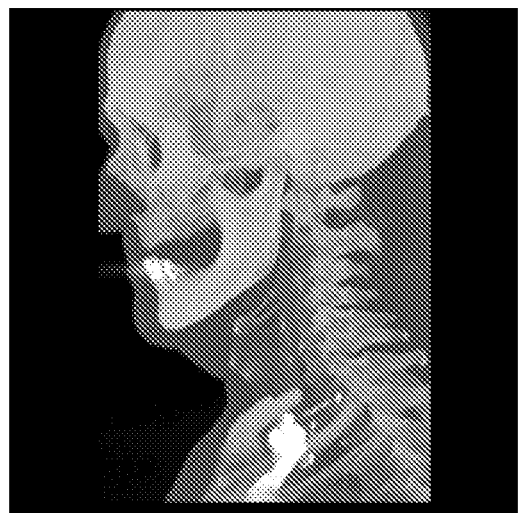

As expected, the case with the four ray packets shown in FIG. 24 shows the best performance. However, the dynamic sampling approach shown in FIG. 26 is only slightly slower and achieves nearly the same performance, indicating that the dynamic case is able to exploit this special constellation and further shows that the overhead introduced by the method according to the invention is small. The static case shown in FIG. 27 is still fast, but does not benefit as much from this special viewing direction constellation as the dynamic case. In this special constellation the swizzled volume cases shown in FIGS. 23 and 28 are the slowest algorithms.

FIGS. 30 through 34 show an analysis of the performance of various trilinear volume sampling algorithms not just for some selected orientations, but for all possible orientations. To achieve this, the space of all theoretical viewing orientations was discretized by factorising this space into a set of inplane orientations. When reducing a single inplane rotation to a single value, the according reduction of all inplane rotations can be visualized by a 2D image. The following 3 reductions of an inplane rotation were taken into account: The fastest rendering time during the inplane rotation, the average rendering time during the inplane rotation and to the largest rendering time during the inplane rotation. This allows to visualize the discretized space of all orientations using three 2D images.

In each image the brightest colour indicates the largest value that occurred, the remaining colours are scaled between zero and the largest value. Large performance differences therefore result in images with large colour differences, while small performance differences result in images that have constant brightness.

For the discretized space of all orientations each of the FIGS. 30 through 34 show analogously to the inplane rotation case three times, the smallest rendering time, the average rendering time and the slowest rendering time across all orientations. The used hardware for these tests was the Nehalem system. The rendered image was the MIP from FIG. 17 as used in the previous examples.

Figure 30:
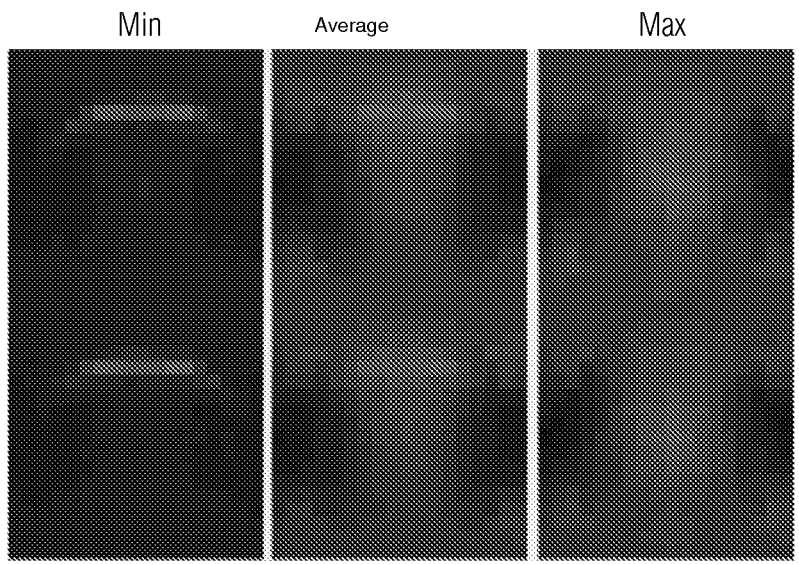
FIGS. 30 through 34 illustrate an analysis of the performance of various trilinear volume sampling algorithms not just for some selected orientations, but for all possible orientations.

As one can see in FIG. 30 showing the 4 ray packet approach, the performance differences between the best and worst case are extremely large. This approach has the fastest best case, but by far the slowest average and the slowest worst case performance.

The images for the dynamic (FIG. 32) and the static (FIG. 33) sampling approach show that a fast rendering time was achieved across all viewing orientations, although the volume dataset was stored as a linear array. This shows that with the method according to the invention it is not necessary to modify the volume dataset storage to achieve an excellent performance for all viewing directions on latest CPU hardware. Interestingly the dynamic and static approaches are in average even much faster than the volume swizzling approach shown in FIG. 31, so not just the goal to avoid having to store the volume dataset in another format was reached, but additionally rendering times that are clearly faster were achieved.

Figure 32:
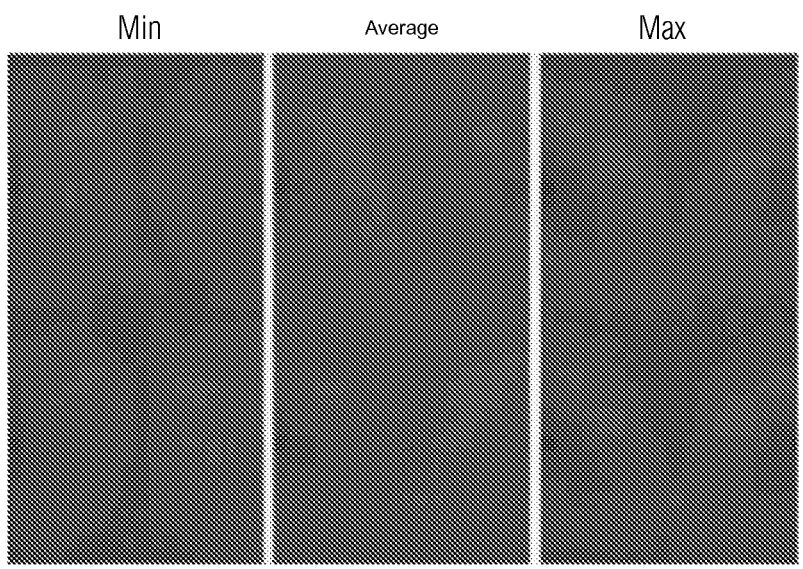

One can also see that the dynamic case shown in FIG. 32 shows a best case performance handling that is very close to the best case performance of the 4 ray approach shown in FIG. 30. The dynamic case has an improved best case rendering performance compared to the static case shown in FIG. 33, since it is able to get a major benefit for some orientations. It is interesting that when looking at the average rendering performance the static case here is only slightly slower than the dynamic case. The reason here is that we analyzed the whole set of orientations here, while the dynamic approach has its benefits to a large degree for orientations that are parallel to one of the major volume axis. These numbers do not reflect that these parallel viewing orientations are much more likely to occur in practice than an average orientation.

Figure 33:
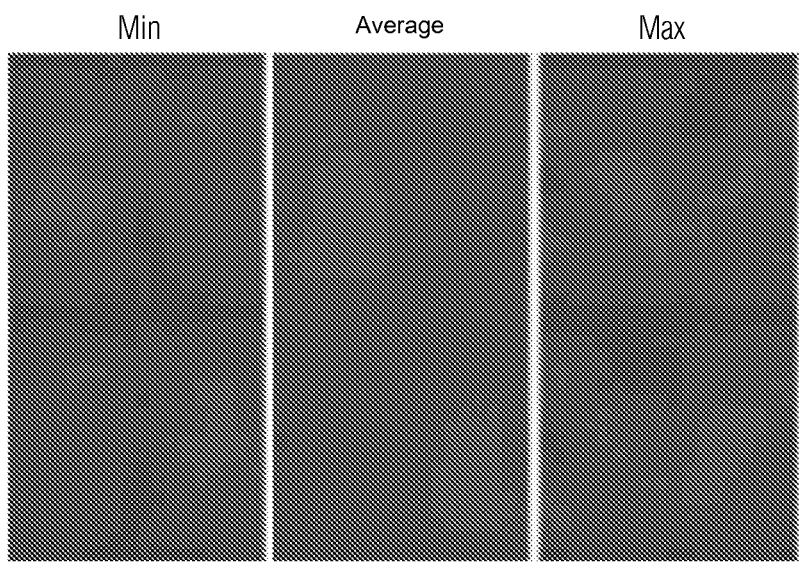
Figure 34:
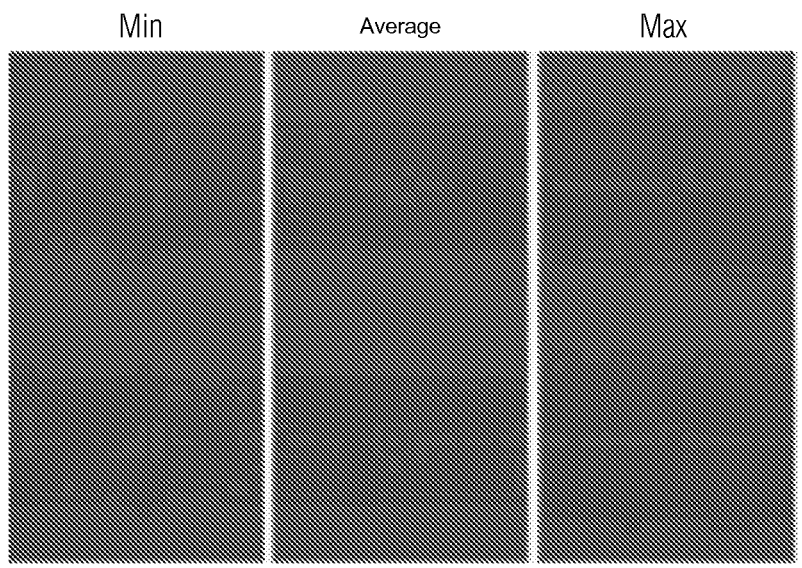

One can see in FIG. 34 that the combination of a swizzled volume dataset combined with the static approach shown in FIG. 33 achieves extraordinary smooth results, indicating that the orientation dependence nearly vanishes.

Because of the large performance advantages of the method according to an embodiment of the invention compared to volume swizzling a short analysis was done on what influence the Nehalem SMT had in this test scenario. With disabled Hyperthreading and using 8 threads instead of 16, the dynamic case results in an average rendering time of 70,05 ms across all orientations, while for the swizzled case one gets 92,47 ms, leading to the following results:

Hyperthreading gives a huge performance advantage in both cases

The method according to the invention seems to benefit more from Hyperthreading, a performance gain by a factor of (70,05/52,16)=1,34 can be seen in the dynamic case, while one gets a factor of (92,47/76,58)=1,21 in the swizzled case.

Figure 35:
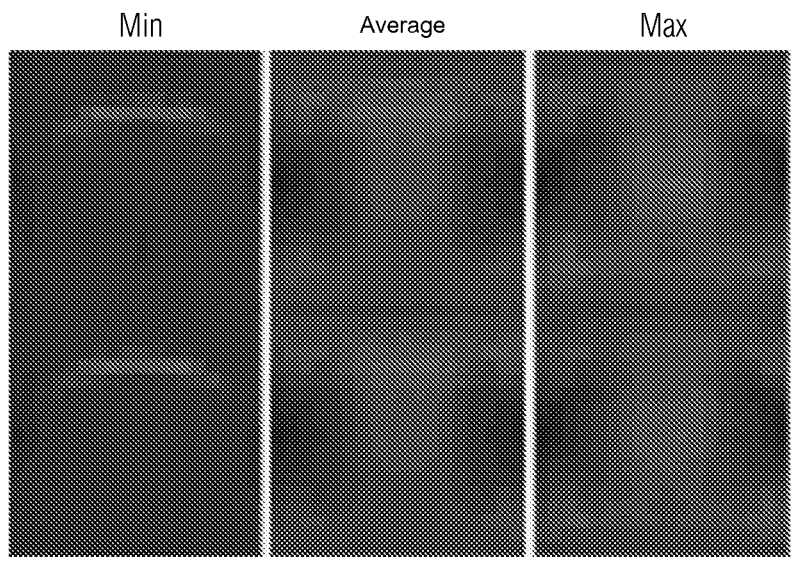
FIGS. 35 through 40 illustrate an analysis of the rendering performance changes when using larger ray packet sizes.
Figure 36:
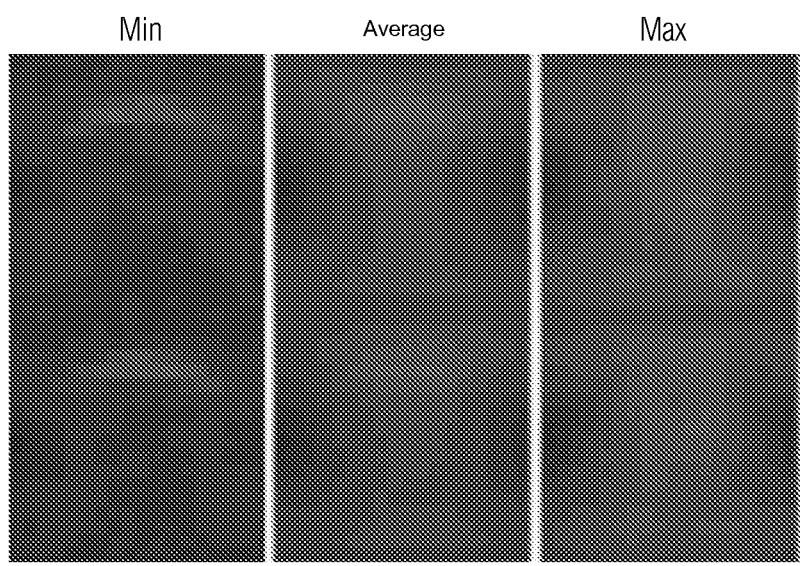
Figure 37:
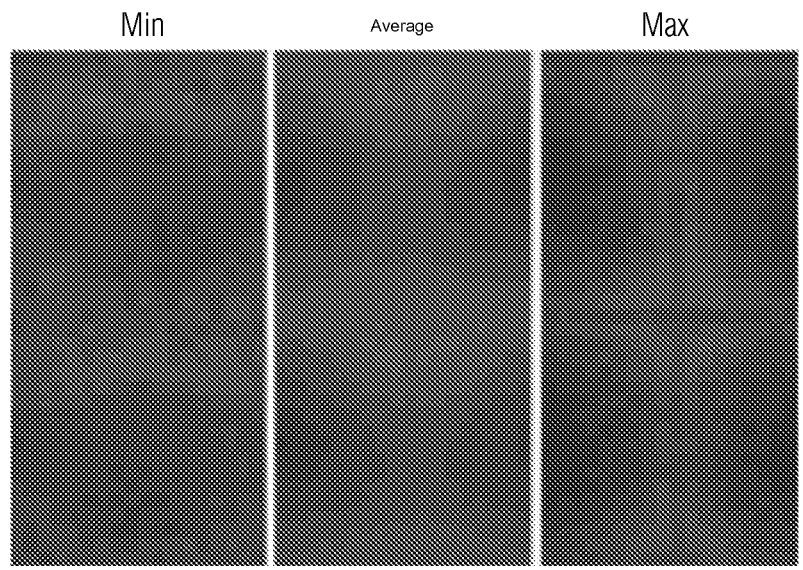
Figure 38:
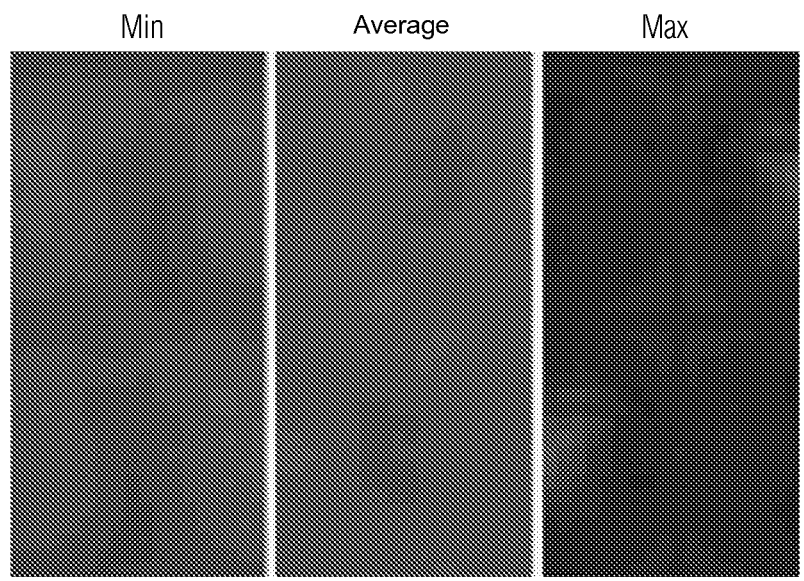
Figure 39:
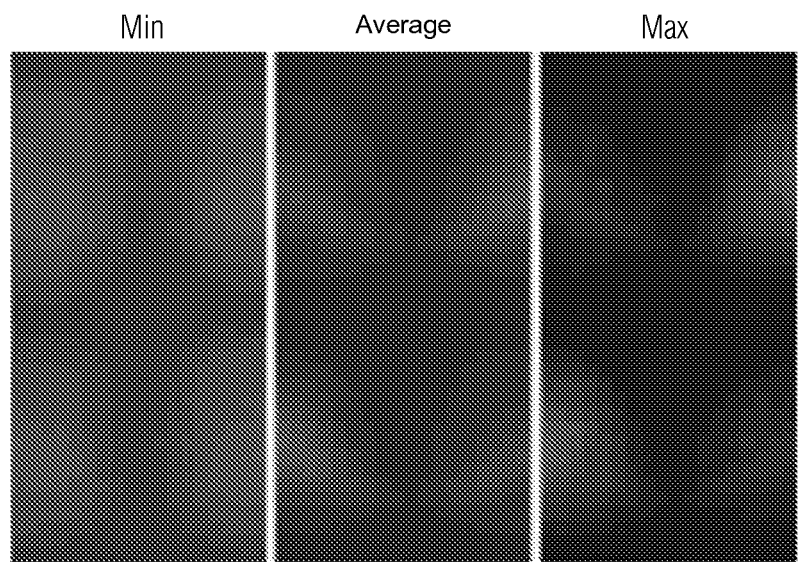
Figure 40:
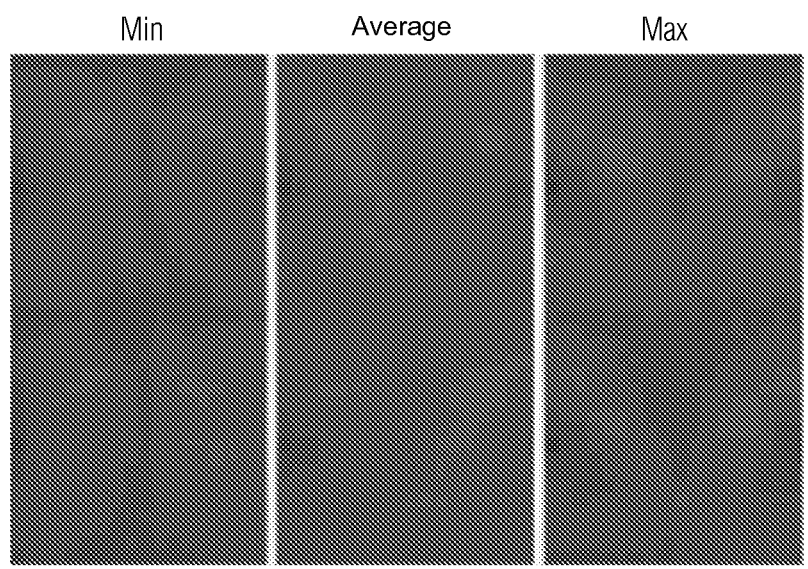

Using ray packets is a very popular approach to increase coherence which is often used in volume rendering as well as in ray tracing applications. In the example shown in FIG. 30, a small ray package size of 4×1 was used which resulted in an algorithm that for various viewing orientations shows enormous cache thrashing effects. In FIGS. 35 through 40 an analysis of the rendering performance changes when using larger ray packet sizes is shown. The test scenario is the same as in the Nehalem example shown in FIG. 30. FIGS. 35 through 40 show a study of the behaviour of such ray packet approaches and compare the results to the approach according to the invention. FIG. 35 shows the results for a 4×2 ray packet, FIG. 36 those for a 4×4 ray packet, FIG. 37 those for a 8×8 ray packet, FIG. 38 those for a 16×16 ray packet, FIG. 39 a 32×32 ray packet and FIG. 40 the dynamic method according to one aspect of an embodiment of the invention.

As one can see the size of a ray packet has a major influence on the resulting rendering time, where the influence also strongly depends on the viewing orientation. In this example the best average performance is achieved by a 16×16 ray packet shown in FIG. 38, however this approach leads for some viewing angles to large rendering times up to 164.56 ms. The smallest worst case rendering time is achieved by a 4×4 ray packet shown in FIG. 36 with 114.29 ms, but here the average rendering time is larger with 73.5 ms. When the ray packet becomes too small or too large one can see that worst case rendering times start too increase further.

The proposed algorithm according to an embodiment of the invention clearly has a much better rendering performance behaviour than the ray packet approaches. It has clearly the best average rendering time and by far the best worst case rendering time in comparison. This proves that the method according to an embodiment of the invention considerably improves the rendering time behaviour for volumes that are stored as a linear slice array compared to the existing ray packet idea.

On the Nehalem system the dynamic and static approaches according to aspects of embodiments of the invention showed excellent rendering times for all viewing orientations for volume datasets stored in a linear format. Here it was not only unnecessary to swizzle the volume data, one even arrived at a considerably faster rendering time. Furthermore, a comparison of the results on the Nehalem system which was shown in FIGS. 30 through 34 with the results on a Harpertown system was done.

Harpertown results (best case, average rendering time, worst case):

| a) 4x1 packet: | 44.35 ms | 293.6 ms | 1815.82 ms |
| a) Swizzled: | 86.43 ma | 94.34 ms | 104.64 ms |
| a) Dynamic: | 52.24 ms | 95.84 ms | 131.59 ms |
| a) Static: | 59.69 ms | 97.39 ms | 131.91 ms |
| a) swizzled + static: | 88.1 ms | 93.69 ms | 98.18 ms |

As one can see in case a) the performance differences between the best and worst case are extremely large. This approach has the fastest best case, but by far the slowest average and the slowest worst case performance. The fastest orientation and the slowest orientation have an incredible performance difference by a factor of 40. This effect was also visible on a Nehalem system (see FIGS. 30 through 34), but in a considerably reduced form, therefore this case excellently demonstrates how dramatically large the cache and memory advancements have been between a Harpertown and the Nehalem system.

Also on a Harpertown system the dynamic and static approaches according to the invention allow working with linearly stored volume dataset without encountering larger cache thrashing effects; however, on that older hardware they do not necessarily result in average rendering times that are faster as swizzled volumes as it was the case on a Nehalem system.

The above shows that the method according to an embodiment of the invention benefits more from Nehalem SMT than this is true for the swizzled volume case, however this does not explain the Nehalem timing advantages fully. Compared to its Harpertown predecessor, the Nehalem architecture has also improved the way how cores access the cache and has improved the available memory bandwidth enormously. One can see that the embodiment of the invention benefits from these Nehalem optimizations much more than the swizzled volume case. As a consequence, the overhead that is created by the volume swizzling is larger on Nehalem systems than the overhead that is introduced by the dynamic and static approaches according to an embodiment of the invention. On older systems this overhead difference seems to be of less importance. Since the cache access handling as well as the memory bandwidth will continue to improve in the future embodiments of the invention should become even more interesting with upcoming next generation hardware.

The above embodiments have been described with regard to the volume rendering case of 3 dimensional volume data, but the developed algorithm can also be used generally for sampling volumes along regular grids, e.g. for registration using mutual information, volume resampling and many more algorithms that have to sample volume data often. The developed algorithm can also be extended to arbitrary dimensions, where one samples n-dimensional volumes along n-dimensional grids. Here, besides the 3 dimensional case also the 2-dimensional case is of especial interest, since this allows to use the method also on planar images.

It has been shown how volume sampling can be interpreted mathematically as a set of sampling position patterns and a method has been developed that dynamically constructs an access pattern to optimize the memory accesses by minimizing cache thrashing. In existing algorithms, while often much effort is put in optimizing the volume storage format, the sampling position access patterns are very simple in nature. The method according to an embodiment of the invention takes a completely different approach; the sampling position access pattern itself is optimized, without having to reformat the volume data format as approaches of the prior art are requiring. The presented method is cache oblivious, which means it is designed to take the fact into account that there can be a hierarchy of memory caches present without having to know about the hierarchy details. Since the method of an embodiment of the invention is dynamic in nature while modifying the volume data format is static in nature, it enables dynamic optimizations that are not possible in the prior art. These ideas allow excellent performance even with volume data formats that lead to bad sampling performance using current algorithms. This is an especially important property since the natural format of a volume, an array of slices, is a format that shows such a bad sampling performance with existing approaches.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combineable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

While there have been shown, described and pointed out fundamental novel features of the invention as applied to preferred embodiments thereof, it will be understood that various omissions and substitutions and changes in the form and details of the method illustrated may be made by those skilled in the art without departing from the spirit of the invention. It is the intention, therefore, to be limited only as indicated by the scope of the claims appended hereto.

| Reference numerals | |
|---|---|
| 6 | rendering time |
| 8 | point |
| 10 | sampling position |
| 12 | ray |
| 16 | binary number |
| 18 | 3-ary number |
| 20, 22, 24 | line |
| 30 | inner circle |
| 32 | line |
| B | block |
| $c_s$ | radius |
| E | object |
| E' | object |
| G | grid |
| i, j, k | integral number |
| J(i) | subset |
| L1, L2, L3 | cache |
| $P_{Front}$ | set |
| $P_{Front}(B)$ | subset |
| $P_{Front\_Sub}(B)$ | set |
| $P_{Front\_Sub}(B, 1)$ | set |
| $P_{Front\_Sub}(B, R)$ | subset |
| $P_{opt}$ | pattern |
| S | position |
| T | title |

| Reference numerals | |
|---|---|
| $v_x, v_y, v_z$ | vector |
| V | volume |
| f(B) | measure function |

What is claimed is:

1. A method for sampling volume data of an object in an imaging device, the method comprising:
creating a voxel dataset of a first volume associated with the object by way of a scanning device and saving the created voxel dataset in a main memory;
defining a grid of sampling positions by casting a plurality of rays through the first volume and choosing a number of points along a respective ray;
choosing a sampling access pattern from a plurality of sampling access patterns defining a sequence of the defined grid of sampling positions;
selecting an interpolation scheme mapping the chosen sampling access pattern to a voxel access pattern defining a sequence of the voxels of the voxel dataset;
according to the voxel access pattern, successively loading memory lines of the main memory including the data associated with the respective voxel into a cache memory in case a respective memory line is not already present in the cache memory; and
processing the data associated with the respective voxel,
wherein during said choosing of sampling access patterns, a block of sampling positions having a non-vanishing intersection with said grid is defined and
wherein said plurality of sampling access patterns is restricted to the set of recursive subdivisions of the block.

2. The method of claim 1, wherein said plurality of sampling access patterns is further restricted to those satisfying the property that
when restricting the sampling access pattern to an arbitrary ray, the sampling positions along this ray are accessed monotonically.

3. The method of claim 2, wherein the size of the block in each spatial direction is an exponential of 2.

4. The method of claim 3, wherein said plurality of rays are parallel with respect to each other.

5. The method of claim 4, wherein said number of points along a respective ray is chosen equidistantly.

6. The method of claim 1, wherein said choosing of a sampling access pattern further comprises:
recursively subdividing the block into sub-blocks; and
choosing a sub-block from a plurality of sub-blocks respectively resulting from subdivisions in several spatial dimensions for a next step of said recursive subdivision.

7. The method of claim 6, wherein, during each step of the subdivision, the number of memory lines loaded for each of the respective resulting sub-blocks is approximated and the sub-block having a relatively least number of memory lines loaded is chosen for a next step of said recursive subdivision.

8. The method of claim 7, wherein the number of memory lines loaded is approximated by determining a convex hull of an affine transformation of the block or sub-block into voxel space, and calculating an area measure of a projection to a selected plane of a second volume associated with the convex hull.

9. The method of claim 8, wherein the voxel dataset of the first volume is created by way of the scanning device serially scanning tomographic cross sections of said first volume and wherein the selected plane is normal to the plane of the tomographic cross sections.

10. The method of claim 8, wherein the second volume is determined extending the convex hull by all spatial points having a distance to the convex hull that is relatively smaller than a selected distance value.

11. The method of claim 6, wherein,
a parallelepiped defined by an affine transformation of the block or sub-block into voxel space is determined, and
the sub-block resulting from the subdivision in the spatial dimension corresponding to a relatively largest edge of the parallelepiped is chosen for a next step of said recursive subdivision.

12. The method of claim 1, wherein sampling positions outside the object are removed from the grid of sampling positions.

13. The method of claim 1, wherein a plurality of blocks of sampling positions covering all of the grid is defined.

14. The method of claim 13, wherein the processing is not performed for a sub-block having all sampling positions outside the object.

15. The method of claim 1, wherein the plurality of sampling access patterns is further restricted to those not including subdivisions in a selected spatial dimension after a selected number of steps of said recursive subdivision.

16. The method of claim 1, wherein the plurality of sampling access patterns is further restricted to those including repeating sequences of subdivisions in certain spatial dimensions.

17. The method of claim 1, wherein processing the data associated with the respective voxel for creation of a two-dimensional image comprises:
linearly saving the data to a memory area according to the sampling access pattern, and
after having processed all data associated with respective rays of a plurality of pixels, permutating the saved data according to a swizzling pattern for creation of said two-dimensional image.

18. The method of claim 17, wherein the swizzling pattern is determined by a two-dimensional reduction of the sampling access pattern.

19. An imaging device, comprising:
at least one processor configured to:
create a voxel dataset of a first volume associated with an object by way of a scanning device and saving the created voxel dataset in a main memory;
define a grid of sampling positions by casting a plurality of rays through the first volume and choosing a number of points along a respective ray;
choose a sampling access pattern from a plurality of sampling access patterns defining a sequence of the defined grid of sampling positions;
select an interpolation scheme mapping the chosen sampling access pattern to a voxel access pattern defining a sequence of the voxels of the voxel dataset;
successively load, according to the voxel access pattern, memory lines of the main memory including the data associated with the respective voxel into a cache memory in case a respective memory line is not already present in the cache memory; and
process the data associated with the respective voxel,
wherein during said choosing of sampling access patterns, the at least one processor is configured to
define a block of sampling positions having a non-vanishing intersection with said grid, and wherein said plurality of sampling access patterns is restricted to the set of recursive subdivisions of the block.

20. A non-transitory computer readable medium including program segments for, when executed on a computer device, causing the computer device to implement the method of claim 1.

* * * * *